US012691448B2

(12) United States Patent
Ma et al.

(10) Patent No.: US 12,691,448 B2
(45) Date of Patent: Jul. 28, 2026

(54) CHIP PACKAGING STRUCTURE AND CHIP PACKAGING METHOD

(71) Applicants: Beijing BOE Technology Development Co., Ltd., Beijing (CN); BOE TECHNOLOGY GROUP CO., LTD., Beijing (CN)

(72) Inventors: Xiangguo Ma, Beijing (CN); Zhukai Liu, Beijing (CN); Ding Ding, Beijing (CN); Lin Deng, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 547 days.

(21) Appl. No.: 18/039,220

(22) PCT Filed: Mar. 25, 2022

(86) PCT No.: PCT/CN2022/083122

§ 371 (c)(1),
(2) Date: May 26, 2023

(87) PCT Pub. No.: WO2023/178671

PCT Pub. Date: Sep. 28, 2023

(65) Prior Publication Data

US 2024/0351026 A1 Oct. 24, 2024

(51) Int. Cl.
*B01L 3/00* (2006.01)

(52) U.S. Cl.
CPC ....... *B01L 3/502715* (2013.01); *B01L 3/5025* (2013.01); *B01L 2200/027* (2013.01); *B01L 2300/0829* (2013.01)

(58) Field of Classification Search
CPC ............ B01L 3/502715; B01L 3/5025; B01L 2200/027; B01L 2300/0829;
(Continued)

(56) References Cited

U.S. PATENT DOCUMENTS

2008/0199362 A1* 8/2008 Chong ................. B01F 25/421
422/400
2009/0179146 A1 7/2009 Lomas et al.

FOREIGN PATENT DOCUMENTS

CN 103667057 A 3/2014
CN 207850932 U 9/2018
(Continued)

OTHER PUBLICATIONS

China Patent Office, Second Office Action, Jan. 20, 2026, for corresponding CN application No. 202280000533.2.

*Primary Examiner* — Christine T Mui
(74) *Attorney, Agent, or Firm* — HOUTTEMAN LAW LLC

(57) ABSTRACT

A chip packaging structure and a chip packaging method, the structure including: a sample substrate with through holes; first and second cover plates on opposite sides of the sample substrate; and at least one pair of a sample inlet and a sample outlet, each pair of the sample inlet and the sample outlet is in one or both of the first cover plate and the second cover plate, a flow path is between each pair of the sample inlet and the sample outlet, a first flow channel structure is on a surface of the first cover plate opposite to the sample substrate, a second flow channel structure is on a surface of the second cover plate opposite to the sample substrate, and the first flow channel structure and the second flow channel structure are connected with the through holes, to form a continuous channel corresponding to the flow path.

20 Claims, 10 Drawing Sheets

(58) Field of Classification Search
CPC ..... B01L 2300/0874; B01L 2300/0883; B01L 2300/0887; B01L 2400/065; B01L 3/502738; B01D 19/00
USPC .................................................. 422/503, 500
See application file for complete search history.

(56) References Cited

FOREIGN PATENT DOCUMENTS

| | | | |
|---|---|---|---|
| CN | 109234153 | A | 1/2019 |
| CN | 209797919 | U | 12/2019 |
| CN | 112371195 | A | 2/2021 |
| CN | 112934277 | A | 6/2021 |
| CN | 113145189 | A | 7/2021 |

* cited by examiner

CHIP PACKAGING STRUCTURE AND CHIP PACKAGING METHOD

TECHNICAL FIELD

The present disclosure relates to the field of digital polymerase chain reaction (dPCR) chip technology, and in particular to a chip packaging structure and a chip packaging method.

BACKGROUND

The digital polymerase chain reaction (dPCR) is an absolute quantification technique for nucleic acid molecules. Compared with the previous generation qPCR (quantitative polymerase chain reaction), the dPCR can directly calculate the number of DNA molecules, give an absolute quantification of an initial sample, and has higher sensitivity and accuracy. The dPCR technique may be divided into two categories: droplet dPCR and micro-trap dPCR. Because it is difficult to maintain a conventional droplet generating device to stably generate uniform droplets for a long time, the micro-trap dPCR attracts more and more attentions, and the main principle of the micro-trap dPCR is to disperse nucleic acid solution into thousands or tens of thousands of micropores in a chip, count fluorescence signals of the micropores after a PCR cycle, and calculate the nucleic acid concentration of the original solution according to Poisson distribution.

However, blind holes are generally adopted as the micropores of the conventional micro-trap dPCR, and there are problems that the sample cannot fully fill the micropores, bubbles exist in the micropores, and the like after the sample enters into the micropores.

SUMMARY

The present disclosure is directed to at least one of the technical problems in the prior art, and provides a chip packaging structure and a chip packaging method, which can solve the problems that the sample cannot fully fill micropores, bubbles exist in the micropores, and the like after the sample enters into the micropores.

To achieve the above object, the present disclosure provides a chip packaging structure, including: a sample substrate having a plurality of through holes therein penetrating through the sample substrate along a thickness direction of the sample substrate; a first cover plate and a second cover plate respectively on two opposite sides of the sample substrate along the thickness direction of the sample substrate and attached to the sample substrate; and at least one pair of a sample inlet and a sample outlet, each pair of the sample inlet and the sample outlet being in one of the first cover plate and the second cover plate or in the first cover plate and the second cover plate, respectively, a flow path existing between each pair of the sample inlet and the sample outlet, where a first flow channel structure is on a surface of the first cover plate opposite to the sample substrate, a second flow channel structure is on a surface of the second cover plate opposite to the sample substrate, and the first flow channel structure and the second flow channel structure are connected together with the plurality of through holes, to form a continuous channel corresponding to the flow path between each pair of the sample inlet and the sample outlet.

In some implementations, the first flow channel structure includes a plurality of first flow channels arranged at intervals; the second flow channel structure includes a plurality of second flow channels arranged at intervals; two through holes of the plurality of through holes on the same flow path are at a start point and an end point of the flow path, respectively, the through hole at the start point includes an end communicated with the sample inlet, and another end communicated with the through hole downstream and adjacent to the through hole at the start point through one first flow channel or one second flow channel; the through hole at the end point includes an end communicated with the sample outlet, and another end communicated with the through hole upstream and adjacent to the through hole at the end point through one first flow channel or one second flow channel; and both ends of each remaining through hole are communicated with two through holes upstream and downstream and adjacent to said each remaining through hole through one first flow channel and one second flow channel, respectively.

In some implementations, the flow path between the at least one pair of the sample inlet and the sample outlet includes a main path and a plurality of branch paths, where two through holes on each branch path are respectively at a start point and an end point of the branch path, and are shared by the main path; the remaining through holes on the branch path are not shared by the main path; and for each shared through hole, the first flow channel or the second flow channel communicated with the shared through hole is communicated with the through hole, adjacent to the shared through hole, upstream or downstream on the main path, and communicated with the through hole, adjacent to the shared through hole, upstream or downstream on the branch path where the shared through hole is located.

In some implementations, the plurality of through holes are arranged in a square array, and through holes at both ends of a first diagonal line of the square array are respectively communicated with one pair of the sample inlet and the sample outlet; and all the through holes on the first diagonal line are on the main path; and the plurality of branch paths are divided into a plurality of pairs, each pair of branch paths is symmetrically distributed on both sides of the first diagonal line, and two through holes at a start point and an end point of each pair of branch paths are shared by the main path, and through holes on a start point and an end point of each branch path are symmetrically distributed on both sides of a second diagonal line of the square array.

In some implementations, the plurality of through holes are arranged in a rectangular or square array, the through holes at a head end and a tail end of a first row or column of the rectangular or square array serve as a start point or an end point of the flow path, and are respectively communicated with one pair of the sample inlet and the sample outlet; and the flow path includes a plurality of sub-paths connected together end to end and in series, the number of the sub-paths is the same as the number of rows or columns of the rectangular or square array, and all the through holes on each row or column of the rectangular or square array are correspondingly on each sub-path.

In some implementations, the plurality of through holes are arranged in a rectangular or square array, the number of pairs of sample inlets and sample outlets is the same as the number of rows or columns of the rectangular or square array, and all the through holes in each row or each column of the rectangular or square array are correspondingly on the flow path between each pair of the sample inlet and the sample outlet.

In some implementations, each first flow channel is a first groove in the surface of the first cover plate opposite to the sample substrate, and each second flow channel is a second groove in the surface of the second cover plate opposite to the sample substrate, and an orthographic projection of an inner surface of each of the first groove and the second groove on a plane parallel to the thickness direction of the sample substrate is of an arc shape.

In some implementations, the arc shape is a shape obtained by taking an arc from a circle or an ellipse.

In some implementations, inner surfaces of a hole wall of each through hole, the first groove and the second groove are all surfaces subjected to hydrophilic treatment; a surface of the sample substrate except for the through holes is a surface subjected to hydrophobic treatment; a surface of the first cover plate except for the inner surface of the first groove is a surface subjected to hydrophobic treatment; and a surface of the second cover plate except for the inner surface of the second groove is a surface subjected to hydrophobic treatment.

In some implementations, the first cover plate and the second cover plate are made of polymethyl methacrylate or glass.

In some implementations, the second flow channel structure is on a surface of the first cover plate away from the sample substrate, and the first flow channel structure is on a surface of the second cover plate away from the sample substrate, so that the first cover plate and the second cover plate form two multi-role cover plates with identical structures; and the two multi-role cover plates are staggered in the thickness direction of the sample substrate, so that the sample inlet and the sample outlet in one multi-role cover plate of the two multi-role cover plates do not overlap with the other multi-role cover plate of the two multi-role cover plates.

In some implementations, the chip packaging structure includes at least three multi-role cover plates, at least one sample substrate is between every two adjacent multi-role cover plates, and sequentially attached together along a direction from the first cover plate to the second cover plate, and the at least three multi-role cover plates are sequentially staggered in the thickness direction of the at least one sample substrate, so that the sample inlet and the sample outlet in each multi-role cover plate do not overlap with the other multi-role cover plates.

In some implementations, the chip packaging structure includes a plurality of sample substrates sequentially attached to each other in a direction from the first cover plate to the second cover plate, each sample substrate includes a through hole region and a non-through hole region, and each through hole is in the through hole region; and every two adjacent sample substrates are slidable with respect to each other, so that the through holes in one of the two adjacent sample substrates are in the through hole region of the other sample substrate and coincide with the through holes in the other sample substrate; or, the through holes in one of the two adjacent sample substrates are in the non-through hole region of the other sample substrate and isolated from the through holes in the other sample substrate.

In some implementations, the through holes in each sample substrate are arranged in a rectangular or square array, a spacing region between every two adjacent rows of through holes and between every two adjacent columns of through holes in the rectangular or square array is the non-through hole region, and a width of the spacing region is greater than two times a diameter of each through hole.

In some implementations, the through holes in each sample substrate are arranged in a rectangular or square array, and a region of the sample substrate outside the rectangular or square array is the non-through hole region capable of accommodating the entire rectangular or square array.

In some implementations, in response to that the through holes in one of the two adjacent sample substrates are in the non-through hole region of the other sample substrate of the two adjacent sample substrates, arrays on all the sample substrates are arranged in an array.

In some implementations, the sample substrate includes a through hole region and a non-through hole region, the through holes are in the through hole region; and each of the first cover plate and the second cover plate is slidable with respect to the sample substrate, so that the first flow channel structure and the second flow channel structure are in the through hole region and are communicated with the through holes; or the first flow channel structure and the second flow channel structure are in the non-through hole region and are isolated from the through holes.

In some implementations, the plurality of through holes are arranged in a square array, and a spacing region between every two adjacent rows of through holes and between every two adjacent columns of through holes in the square array is the non-through hole region, and a width of the spacing region is greater than that of each of the first flow channel structure and the second flow channel structure.

The present disclosure further provides a chip packaging method, applied to the chip packaging structure provided in the present disclosure, including: injecting a sample from each sample inlet until the sample fully fills the continuous channel along the flow path and flows out from the sample outlet; peeling off one of the first cover plate and the second cover plate from the sample substrate; attaching a sealing cover plate to the surface of the sample substrate, to which one of the first cover plate and the second cover plate is previously attached, a sealing groove being provided in the sealing cover plate, and an orthographic projection of the sealing groove on a plane parallel to the sample substrate completely covers an orthographic projection of all the through holes on the plane parallel to the sample substrate, and an inlet and an outlet being provided in the sealing cover plate and communicated with the sealing groove; injecting a sealing medium into the sealing groove from the inlet until the sealing medium fully fills the sealing groove and flows out from the outlet; blocking the inlet and the outlet, and then turning over the chip packaging structure by 180°; peeling off the other of the first cover plate and the second cover plate from the sample substrate; attaching another sealing cover plate to the surface of the sample substrate, to which the other of the first cover plate and the second cover plate is previously attached; injecting a sealing medium into a sealing groove from an inlet of the another sealing cover plate until the sealing medium fully fills the sealing groove and flows out from an outlet; and blocking the inlet and the outlet of the another sealing cover plate.

In some implementations, the chip packaging structure includes a plurality of sample substrates sequentially attached to each other in a direction from the first cover plate to the second cover plate, each sample substrate includes a through hole region and a non-through hole region, and each through hole is located in the through hole region; and every two adjacent sample substrates are slidable with respect to each other, so that through holes in one of the two adjacent sample substrates are located in the through hole region of the other sample substrate and coincide with the through holes in the other sample substrate; or, the through holes in one of the two adjacent sample substrates are located in the non-through hole region of the other sample substrate and isolated from the through holes in the other sample substrate; and after blocking the inlet and the outlet of the another sealing cover plate, the chip packaging method further includes: keeping still a first sample substrate adjacent to the first cover plate or the second cover plate, and sequentially sliding the other sample substrates, until through holes in one of the two adjacent sample substrates are located in the non-through hole region of the other sample substrate and isolated from through holes in the other sample substrate.

The present disclosure further provides a chip packaging method, applied to the chip packaging structure provided in the present disclosure, including: enabling the first flow channel structure and the second flow channel structure to be located in the through hole region and to be communicated with the through holes; injecting a sample from each sample inlet until the sample fully fills the continuous channel along the flow path and flows out from the sample outlet; and sliding each of the first cover plate and the second cover plate with respect to the sample substrate, so that the first flow channel structure and the second flow channel structure are located in the non-through hole region.

DETAIL DESCRIPTION OF EMBODIMENTS

Figure 1:
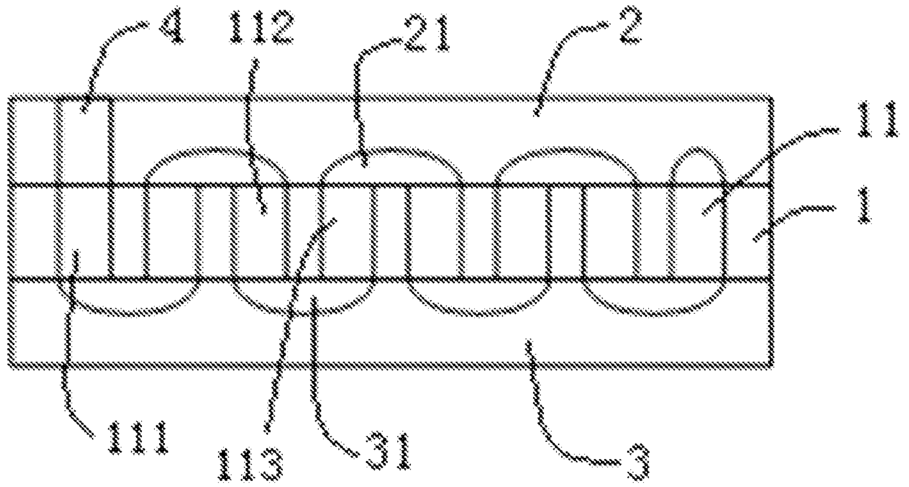
FIG. 1 is a side cross-sectional view of a chip packaging structure according to a first embodiment of the present disclosure.

To make objects, technical solutions and advantages of the present disclosure more apparent, the present disclosure will be described in further detail with reference to the accompanying drawings. It is apparent that the described embodiments are only some, not all, embodiments of the present disclosure. All other embodiments, which can be derived by a person skilled in the art from the embodiments disclosed herein without any creative effort, shall fall within the protection scope of the present disclosure.

The shapes and sizes of various elements shown in the drawings are not necessarily drawn to scale and are merely intended to facilitate an understanding of contents of the embodiments of the present disclosure.

Unless defined otherwise, technical or scientific terms used herein shall have the ordinary meaning as understood by one of ordinary skill in the art to which the present disclosure belongs. The terms “first”, “second”, and the like used in the present disclosure are not intended to indicate any order, quantity, or importance, but rather are used for distinguishing one element from another. Further, the term “a”, “an”, “the”, or the like used herein does not denote a limitation of quantity, but rather denotes the presence of at least one element. The term of “comprising”, “including”, or the like, means that the element or item preceding the term contains the element or item listed after the term and its equivalent, but does not exclude other elements or items. The term “connected”, “coupled”, or the like is not limited to physical or mechanical connections, but may include electrical connections, whether direct or indirect connections. The terms “upper/on/above”, “lower/below/under”, “left”, “right”, and the like are used only for indicating relative positional relationships, and in response to that an absolute position of an object being described is changed, the relative positional relationships may be changed accordingly.

The disclosed embodiments are not limited to the embodiments shown in the drawings, but include modifications of configurations formed based on a manufacturing process. Thus, areas illustrated in the drawings have schematic properties, and shapes of the areas shown in the drawings illustrate specific shapes of the areas of elements, but are not intended to be limiting.

First Embodiment

As shown in FIG. 1, the chip packaging structure provided in this embodiment includes a sample substrate 1, a first cover plate 2, a second cover plate 3, and at least one pair of a sample inlet 4 and a sample outlet (not shown). A plurality of through holes 11 are arranged in the sample substrate and penetrate through the sample substrate 1 along a thickness direction of the sample substrate 1 (i.e., a direction in which a thickness of the sample substrate 1 extends); the first cover plate 2 and the second cover plate 3 are respectively located on two opposite sides of the sample substrate 1 along the thickness direction of the sample substrate 1 and are attached to the sample substrate 1; each pair of the sample inlet 4 and the sample outlet is located in one of the first cover plate 2 and the second cover plate 3 or located in the first cover plate 2 and the second cover plate 3, respectively; a flow path is provided between each pair of the sample inlet 4 and the sample outlet; a first flow channel structure is provided on a surface of the first cover plate 2 opposite (facing or close) to the sample substrate 1, a second flow channel structure is provided on a surface of the second cover plate 3 opposite (facing or close) to the sample substrate 1, and the first flow channel structure and the second flow channel structure are connected together with the plurality of through holes 11, to form a continuous channel corresponding to the flow path between each pair of the sample inlet 4 and the sample outlet.

For each pair of the sample inlet 4 and the sample outlet, the continuous channel extends along the flow path between the sample inlet 4 and the sample outlet, so that the sample can enter the continuous channel through the sample inlet 4, then flow through the continuous channel along the flow path, and then flow out from the sample outlet; the continuous channel is composed of the first flow channel structure on the first cover plate 2, the second flow channel structure on the second cover plate 3, and the through holes in the flow path. Thus, the sample can fully fill all the through holes, and no bubble is to be generated because the through holes penetrate through the sample substrate 1, thereby solving the problems, in the prior art, that the sample cannot fully fill micropores, bubbles exist in the micropores, and the like after the sample enters into the micropores.

Figure 2:
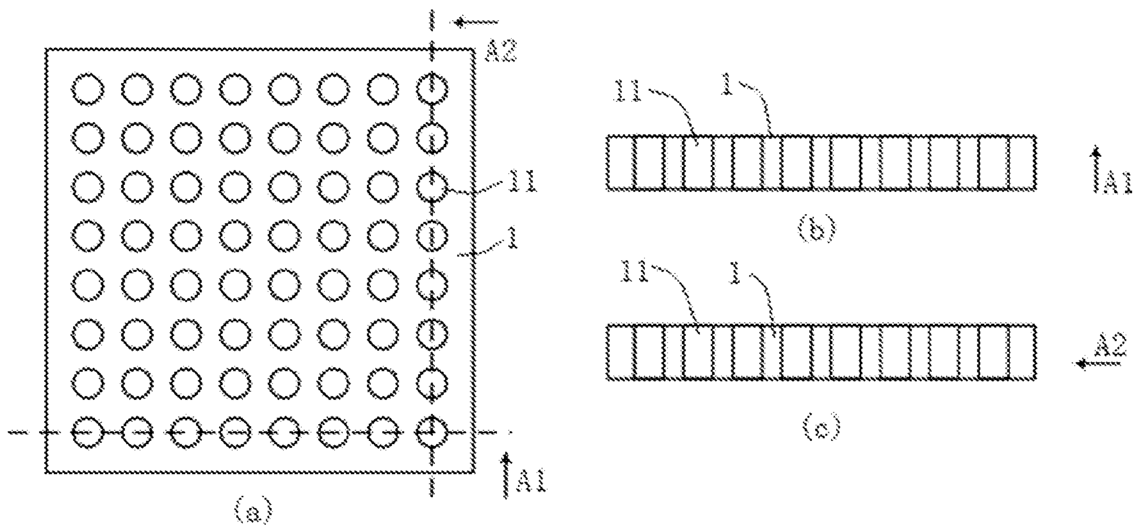
FIG. 2 shows a top view of a sample substrate and cross-sectional views of the sample substrate taken along directions A1, A2 according to a first embodiment of the present disclosure.

In some implementations, as shown in FIG. 2, the plurality of through holes 11 are arranged in a square array, and the number of rows and the number of columns of the square array are 100×100 (FIG. 2 only schematically shows 8×8); each through hole 11 is a round hole; and a diameter of each round hole is in a range from 50 μm to 100 μm, for example, may be equal to 80 μm; a depth of each round hole is in a range from 100 μm to 300 μm, for example, may be equal to 300 μm; a distance between every two adjacent round holes is in a range from 100 μm to 200 μm, for example, may be equal to 180 μm. However, the embodiment is not limited to above. In practical applications, the plurality of through holes 11 may also be arranged in an array of any other shape as desired, for example, may be arranged in a rectangular array, a circular array, a honeycomb array, or the like. Alternatively, the plurality of through holes 11 may also be arranged in other manners, instead of being arranged in an array, which is not limited in the present disclosure.

In some implementations, in order to improve the hydrophobic property of the cover plate and thus, enable the cover plate to be peeled off more easily, materials of the first cover plate 2 and the second cover plate 3 include PMMA (polymethyl methacrylate) or glass. However, the embodiment is not limited to above. In practical applications, the materials of the first cover plate 2 and the second cover plate 3 may also be other materials that are easy to be peeled off.

In some implementations, the first cover plate 2 and the second cover plate 3 may be adhered to the sample substrate 1 by using glue, for example, a glue with a low viscidity, such as a pressure sensitive glue to be peeled off by a relatively low peel strength. Alternatively, the first cover plate 2 and the second cover plate 3 may be attached to the sample substrate 1 in another way for attaching plates in layers together, such as an attaching way through a pressure.

It should be noted that the first cover plate 2 and the second cover plate 3 may serve as packaging cover plates of the sample substrate 1, that is, the first cover plate 2, the second cover plate 3 and the sample substrate 1 together form a chip. In this case, after the sample being introduced for the sample substrate 1 by using the first cover plate 2 and the second cover plate 3, the first cover plate 2 and the second cover plate 3 are used for packaging, so that the sample in the sample substrate 1 is isolated from outside. A specific packaging manner may include: sliding the first cover plate 2 and the second cover plate 3 with respect to the sample substrate 1 (as described in detail below). Alternatively, the first cover plate 2 and the second cover plate 3 may be used for packaging in any other packaging manner. Alternatively, after the sample being introduced for the sample substrate 1 by using the first cover plate 2 and the second cover plate 3, the first cover plate 2 and the second cover plate 3 may be peeled off from the sample substrate 1, and then other packaging cover plates are attached to surfaces of the sample substrate 1, to which the first cover plate 2 and the second cover plate 3 are previously attached (which will be described in detail later), so that the sample in the sample substrate 1 is isolated from outside. In this case, the sample substrate 1 and the attached packaging cover plates form a chip, and the first cover plate 2 and the second cover plate 3 serve as a packaging structure for introducing the sample into the sample substrate 1 and are peeled off after the sample being introduced for the sample substrate 1. The chip is, for example, a digital polymerase chain reaction (dPCR) chip.

In some implementations, the sample substrate may be made of a transparent material such as a glass; and alternatively, may be made of silicon to facilitate a preparation of the sample substrate.

Figure 3:
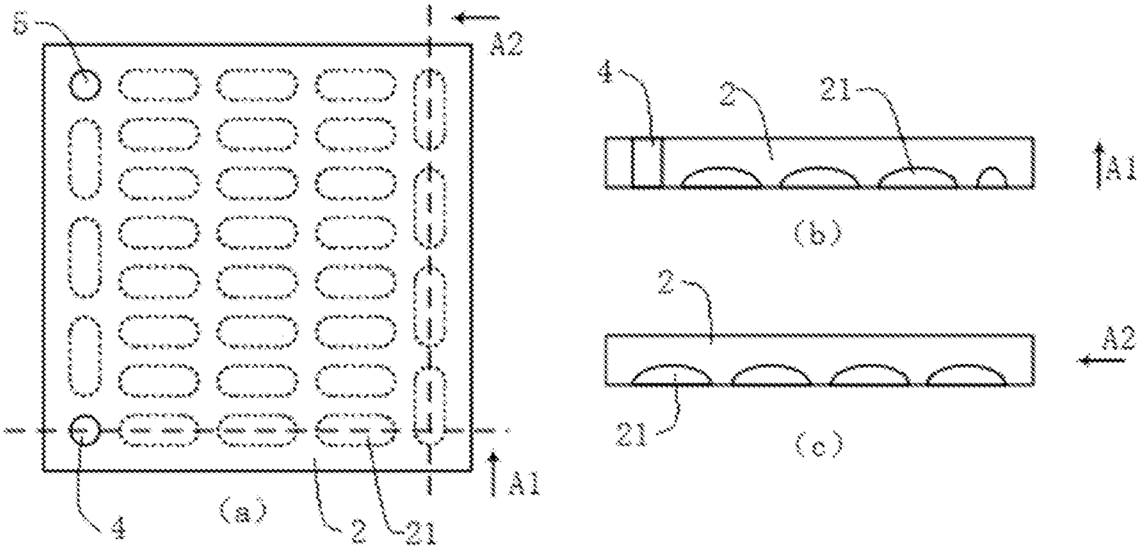
FIG. 3 shows a top view of a first cover plate and cross-sectional views of the first cover plate taken along directions A1, A2 according to a first embodiment of the present disclosure.
Figure 4:
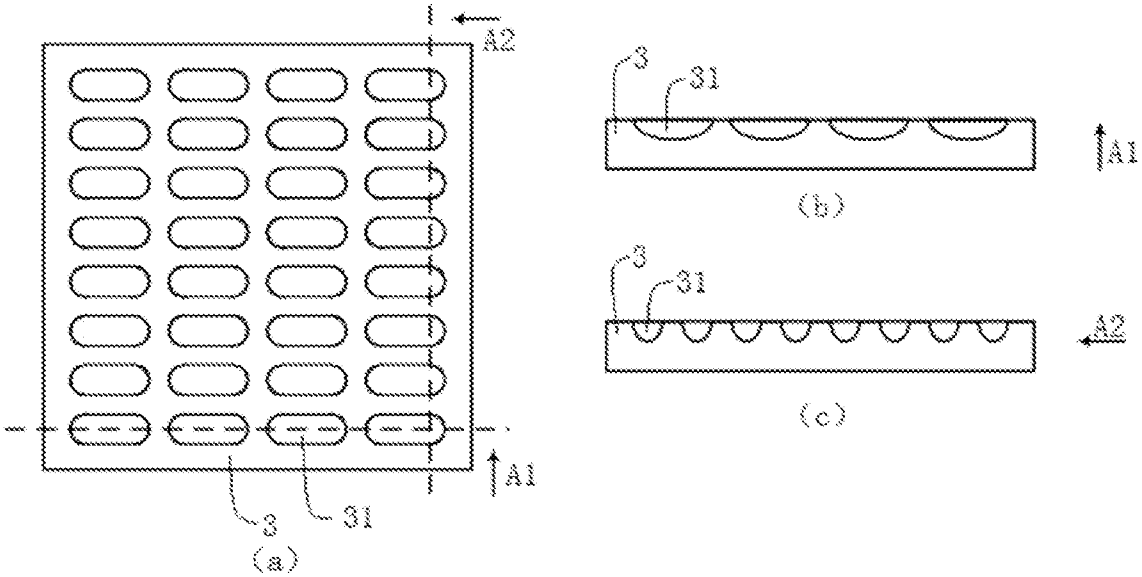
FIG. 4 shows a top view of a second cover plate and cross-sectional views of the second cover plate taken along directions A1, A2 according to a first embodiment of the present disclosure.

The first flow channel structure and the second flow channel structure each may have various structures. For example, as shown in FIGS. 3 and 4, the first flow channel structure includes a plurality of first flow channels 21 arranged at intervals; the second flow channel structure includes a plurality of second flow channels 31 arranged at intervals. Moreover, as shown in FIG. 1, two through holes 11 of the through holes 11 on the same flow path are respectively located at a start point and an end point of the flow path, the through hole 11 located at the start point includes an end communicated with (connected to) the sample inlet 4, and another end communicated with the through hole 11 downstream and adjacent to the through hole 11 located at the start point through the first flow channel 21 or the second flow channel 31; the through hole 11 located at the end point includes an end communicated with the sample outlet, and another end communicated with the through hole 11 upstream and adjacent to the through hole 11 located at the end point through the first flow channel 21 or the second flow channel 31; both ends of each remaining through hole 11 are communicated with two through holes 11, upstream and downstream, adjacent to said each remaining through hole 11 through the first flow channel 21 and the second flow channel 31, respectively.

Specifically, in the embodiment, as shown in FIG. 1, for any three adjacent through holes 11 on the same flow path, a first through hole 111, a second through hole 112 and a third through hole 113 are sequentially provided along a direction from the start point to the end point of the flow path, the first flow channel 21 is communicated with the first through hole 111 and the second through hole 112, the second flow channel 31 is communicated with the second through hole 112 and the third through hole 113, so that the sample can sequentially flow through the first through hole 111, the first flow channel 21, the second through hole 112, the second flow channel 31 and the third through hole 113. Alternatively, the second flow channel 31 is communicated with the first through hole 111 and the second through hole 112, and the first flow channel 21 is communicated with the second through hole 112 and the third through hole 113, so that the sample can sequentially flow through the first through hole 111, the second flow channel 31, the second through hole 112, the first flow channel 21 and the third through hole 113. Thus, any three adjacent through holes 11 can be communicated with each other by means of the first flow channel 21 and the second flow channel 31, so that a continuous channel extending along the flow path can be formed.

In some implementations, each first flow channel 21 is a first groove formed in the surface of the first cover plate 2 opposite to the sample substrate 1, and each second flow channel 31 is a second groove formed in the surface of the second cover plate 3 opposite to the sample substrate 1, and an orthographic projection of an inner surface of each of the first groove and the second groove on a plane parallel to a thickness direction of the sample substrate 1 is of an arc shape. In this way, a corner of about 90° or less in the inner surface of the first groove or the second groove can be avoided, and the generation of bubbles can be further avoided. Specifically, for example, the arc shape is a shape obtained by taking an arc from a circle or an ellipse (i.e., an arc part of a circle or an ellipse).

In some implementations, a width of each of the first and second grooves is approximately the same as a diameter of each through hole 11, and a depth of each of the first and second grooves is, for example, about 10 μm. In addition, in some implementations, for example, an orthographic projection of each of the first groove and the second groove on a plane parallel to the sample substrate 1 is of a long circle shape, and orthographic projections of two circular arc parts at two ends of the long circle shape on the plane parallel to the sample substrate 1 respectively coincide with orthographic projections of two through holes 11 communicated with the long circle shape on the plane parallel to the sample substrate 1.

It should be noted that, in the embodiment, the first flow channel 21 and the second flow channel 31 each are used for communicating two adjacent through holes together, but the embodiment is not limited thereto. In practical applications, alternatively, the first flow channel 21 and the second flow channel 31 each may be used for communicating together three adjacent through holes, four adjacent through holes, or five adjacent through holes or more according to different arrangements of the through holes, different communication paths, or the like, which is not particularly limited by the present disclosure.

In some implementations, in order to ensure that the sample can smoothly enter the through holes 11 and reduce the sample adsorbed by the surfaces of the cover plates except for the grooves, inner surfaces of first groove and second groove are surfaces subjected to hydrophilic treatment, and surfaces of the first cover plate 2 except for the inner surfaces of the first grooves are surfaces subjected to hydrophobic treatment; surfaces of the second cover plate 3 except for the inner surfaces of the second grooves are surfaces subjected to hydrophobic treatment. The hydrophilic treatment includes various methods. For example, the first cover plate 2 and the second cover plate 3 may be immersed and washed in acid solution or alkali solution, and be subjected to plasma treatment, coated with a surfactant, coated with a hydrophilic silane modification agent, or the like. The hydrophobic treatment includes various methods. For example, a silicon nitride film layer, a polytetrafluoroethylene film layer are formed on the surfaces of the first cover plate 2 and the second cover plate 3 except for the grooves, and a hydrophobic silane modification agent or the like is coated on the surfaces. In addition, a hole wall of each through hole 11 in the sample substrate 1 may also be a surface subjected to the hydrophilic treatment, and the surface of the sample substrate 1 except for the through holes 11 may be a surface subjected to the hydrophobic treatment.

Figure 5A:
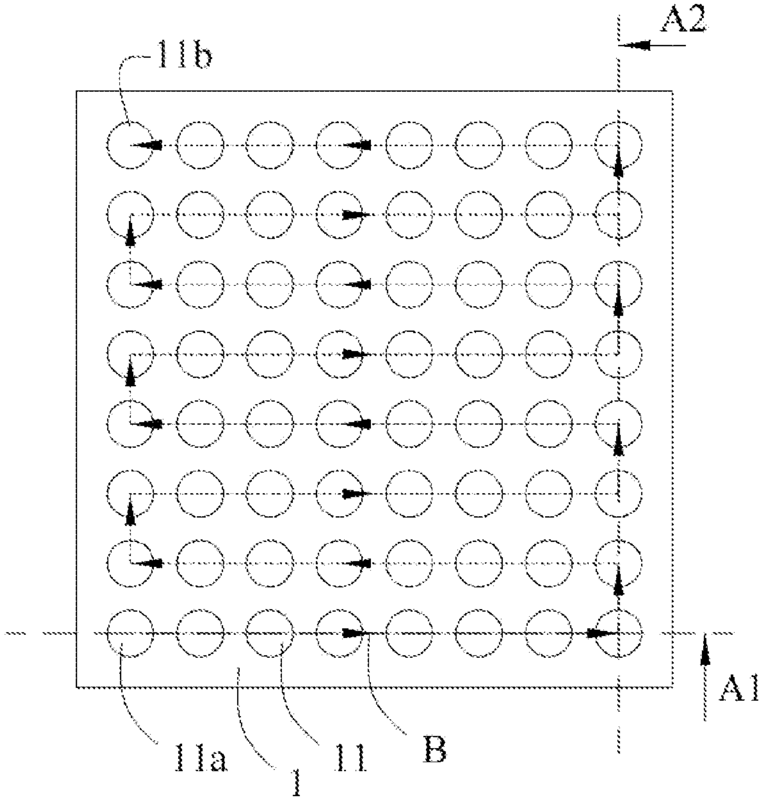
FIG. 5A is a schematic diagram of flow paths of a plurality of through holes in a sample substrate according to a first embodiment of the present disclosure.

The communication path between each pair of the sample inlet and the sample outlet may be various. For example, as shown in FIG. 5A, the plurality of through holes 11 are arranged in a square array, with a row direction parallel to a direction A1 (a horizontal direction) and a column direction parallel to a direction A2 (a vertical direction), and the number of rows and the number of columns are 8×8; a head end through hole 11*a* (a through hole 11*a* at a head end) and a tail end through hole 11*b* (a through hole 11*b* at a tail end) in the first column (leftmost column in the vertical direction of FIG. 5A) of the square array serve as a start point or an end point of a flow path B, and are respectively communicated with one pair of the sample inlet 4 and the sample outlet 5 (shown in FIG. 3); the flow path B includes a plurality of sub-paths connected together end to end and in series, the number of the sub-paths is the same as the number of rows of the square array, and all the through holes 11 on each row of the square array are correspondingly located on each sub-path. Thus, after entering the head end through hole 11*a* through the sample inlet 4, the sample flows along the sub-path where the first row of the square array is located, then flows into a tail end through hole of the second row from a tail end through hole of the first row, then flows along the sub-path where the second row is located, and then flows into a head end through hole of the third row from a head end through hole of the second row, and so on, until the sample flows to the tail end through hole 11*b* and flows out from the sample outlet 5. In such case, the sample fully fills all the through holes, and is introduced completely.

Figure 5B:
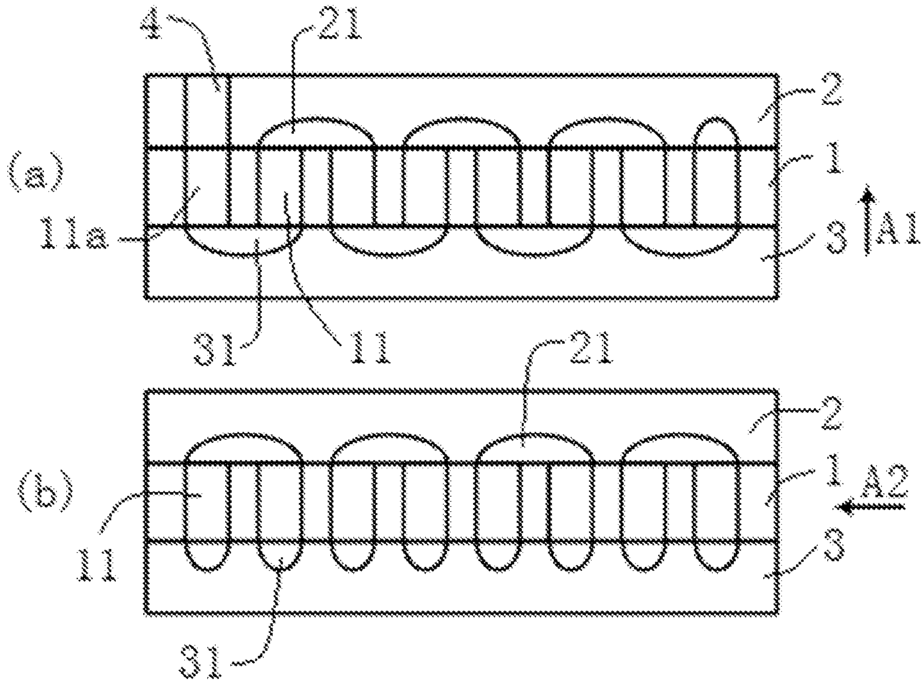
FIG. 5B shows cross-sectional views of a chip packaging structure taken along directions A1, A2 in FIG. 5A according to a first embodiment of the present disclosure.

The structure and the arrangement of the first flow channels 21 of the first cover plate 2 and the second flow channels 31 of the second cover plate 3 are shown in FIGS. 3, 4 and 5B, which correspond to the flow path B. After entering the head end through hole 11*a* through the sample inlet 4, the sample flows into the through hole 11 in the first row downstream and adjacent to the head end through hole 11*a* through the second flow channel 31, then flows into another adjacent through hole 11 downstream in the first row through the first flow channel 21, and so on, so that all the through holes on the flow path B are communicated with each other, to form a continuous channel.

It should be noted that, in practical applications, the sub-paths may be adjusted, with a head end through hole and a tail end through hole in one of the last column (the rightmost column in the vertical direction in FIG. 5A), the first row (the lowermost row in the horizontal direction in FIG. 5A), or the last row (the uppermost row in the horizontal direction in FIG. 5A) of the square array serving as the start point or the end point of the flow path, such that all the through holes on the flow path are communicated with each other, to form the continuous channel; alternatively, any two through holes in the square array may be selected as the start point or the end point of the flow path, and any flow path capable of communicating all the through holes together to form the continuous channel may be adopted, which is not particularly limited by the present disclosure.

It should be noted that, in the embodiment, the sample inlet 4 and the sample outlet 5 are in one pair, and the flow path between the sample inlet 4 and the sample outlet 5 is formed by a main path, but the embodiment is not limited thereto. In practical applications, alternatively, a plurality of pairs of sample inlets 4 and sample outlets 5 may be included, and each pair of the sample inlet 4 and the sample outlet 5 corresponds to a flow path, and certainly, the flow path may be formed by at least one main path between the sample inlet 4 and the sample outlet 5, or may be formed by a combination of at least one main path and at least one branch path, which is not particularly limited in the present disclosure. In addition, the sample inlets 4 and the sample outlets 5 may not be provided in pairs, that is, one group of sample inlets 4 may correspond to one sample outlet 5, or one sample inlet may correspond to one group of sample outlets 5, or one group of sample inlets 4 may correspond to one group of sample inlets 5, each group of sample inlets 4 includes multiple sample inlets 4 and each group of sample outlets 5 includes multiple sample outlets 5. However, no matter the group (of sample inlets or sample outlets) corresponds to the individual (the sample outlet or the sample inlet), or the group (of sample inlets or sample outlets) corresponds to the group (of sample outlets or sample inlets), the design of the corresponding flow path between the two is similar to that of the flow path between the one pair of the sample inlet 4 and the sample outlet 5 as described above.

It should be noted that, in the embodiment, the sample inlet 4 and the sample outlet 5 are both located in the first cover plate 2. However, the embodiment is not limited thereto. In practical applications, the sample inlet 4 and the sample outlet 5 may also be both located in the second cover plate 3, or located in the first cover plate 2 and the second cover plate 3, respectively. In other words, each of the sample inlet 4 and the sample outlet 5 may face upward or downward.

Second Embodiment

Compared with the first embodiment, the chip packaging structure provided in this embodiment also includes the sample substrate 1, the first cover plate 2 and the second cover plate 3, and the at least one pair of the sample inlet 4 and the sample outlet 5. The structures and functions of these components are the same as those in the first embodiment, but the difference between the first embodiment and the second embodiment is in the flow path.

Specifically, in order to increase the speed that the sample is introduced, the flow path between the at least one pair of the sample inlet 4 and the sample outlet 5 includes a main path and a plurality of branch paths, two through holes of the through holes on each branch path are respectively located at a start point and an end point of the branch path, and are shared by the main path (the two through holes on the branch path are common to any two through holes on the main path); the remaining through holes on the branch path are not shared by the main path. That is, the start point of each branch path and one of the through holes in the main path are the same through hole (i.e., shared through hole), the end point of each branch path and another one of the through holes in the main path are the same through hole (i.e., shared through hole); and the remaining through holes in the branch path are not shared through holes, so that both ends of the branch path are communicated with the main path. In this way, the sample can simultaneously flow from one of the shared through holes on the main path to the through hole downstream and adjacent to the shared through hole on the main path and the through hole downstream and adjacent to the shared through hole on the branch path corresponding to the shared through hole, and then the sample flowing through the branch path is merged with the sample flowing through the main path at the shared through hole corresponding to the end point of the branch path.

On this basis, for each shared through hole, the first flow channel 21 or the second flow channel 31 communicated with the shared through hole is communicated with the through hole 11, upstream or downstream, adjacent to the shared through hole on the main path, and communicated with the through hole, upstream or downstream, adjacent to the shared through hole on the branch path where the shared through hole is located. That is, the first flow channel 21 or the second flow channel 31 communicated with the shared through hole can communicate three adjacent through holes (one through hole on the main path and two through holes on two branch paths adjacent to the through hole on the main path) or four adjacent through holes (two adjacent through holes on the main path and two through holes on two branch paths adjacent to an upstream one of the two adjacent through holes on the main path) together, thereby realizing the communication between both ends of each branch path and the main path.

There are various ways in which the flow path is formed by the combination of the at least one main path and the at least one branch path. In some implementations, as shown in FIGS. 6A and 6B, the plurality of through holes 11 are arranged in a square array, and the sample inlet 4 and the sample outlet 5 are in one pair, and through holes (11*a*, 11*b*) at both ends of a first diagonal line C1 of the square array are respectively communicated with the sample inlet 4 and the sample outlet 5; as shown in FIG. 6B, the flow path includes one main path D1, and all the through holes on the first diagonal line C1 are on the main path D1, and the through holes (11*a*, 11*b*) are located at a start point and an end point of the main path D1, respectively.

Figure 6A:
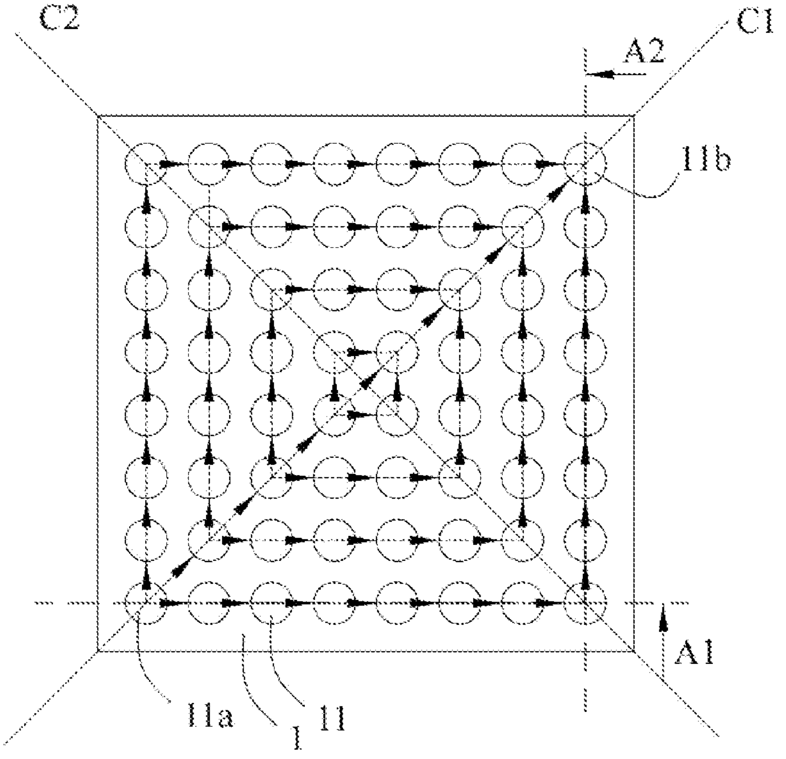
FIG. 6A is a schematic diagram of flow paths of a plurality of through holes in a sample substrate according to a second embodiment of the present disclosure.

Furthermore, as shown in FIG. 6A, a plurality of pairs of branch paths are included, each pair of branch paths is symmetrically distributed on both sides of the first diagonal line C1, and the two through holes located at the start point and the end point of each pair of branch paths are common to any two through holes on the main path D1 (i.e., are shared by the main path D1), and through holes on a start point and an end point of each branch path are symmetrically distributed on both sides of a second diagonal line C2 of the square array. Specifically, as shown in FIG. 6B, by taking a pair of branch paths (D2*a*, D2*b*) as an example, the branch paths are symmetrically distributed on both sides of the first diagonal line C1, and the two through holes at the start point and the end point of the pair of branch paths (D2*a*, D2*b*) are the same as the two through holes (11*a*, 11*b*) at the start point and the end point of the main path D1, i.e., the two through holes (11*a*, 11*b*) are shared through holes, and are symmetrically distributed on both sides of the second diagonal line C2. The remaining pairs of branch paths are arranged in a similar manner as the pair of branch paths (D2*a*, D2*b*). In this way, the branch paths on one side of the first diagonal line C1 are the same as those on the other side of the first diagonal line C1, thereby achieving uniform shunt of the sample.

Figure 6B:
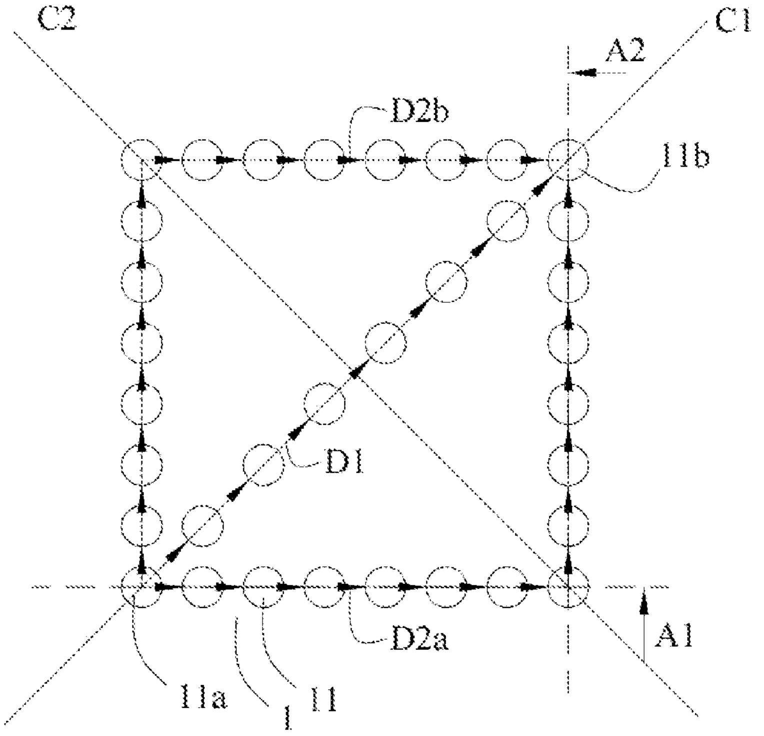
FIG. 6B is a schematic diagram illustrating a positional relationship between one of branch paths and a main path in FIG. 6A.
Figure 7:
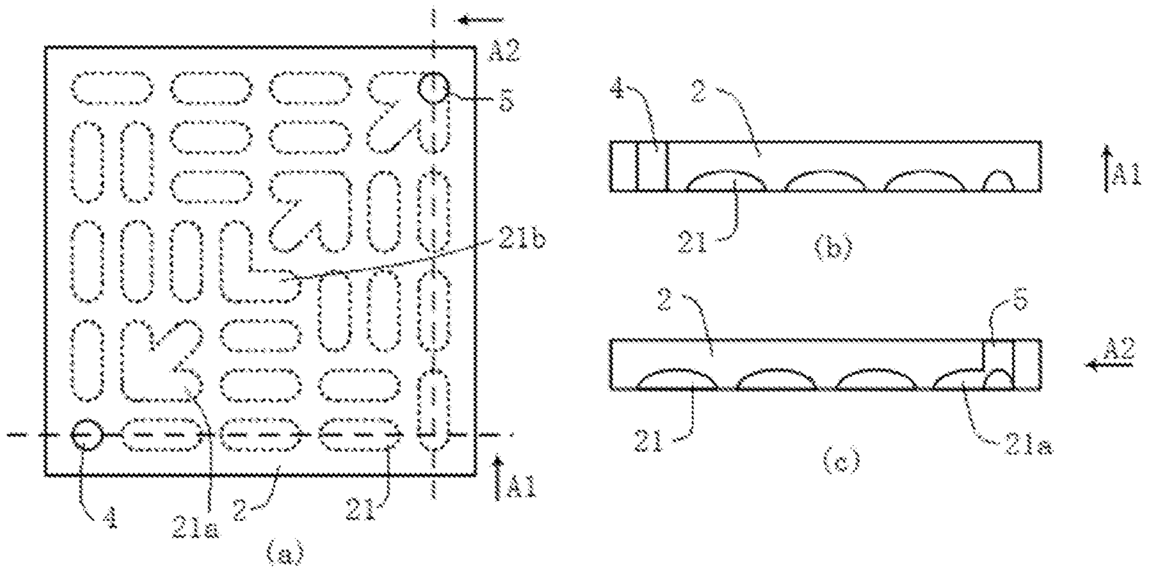
FIG. 7 shows a top view of a first cover plate and cross-sectional views of the first cover plate taken along directions A1, A2 according to a second embodiment of the present disclosure.
Figure 8:
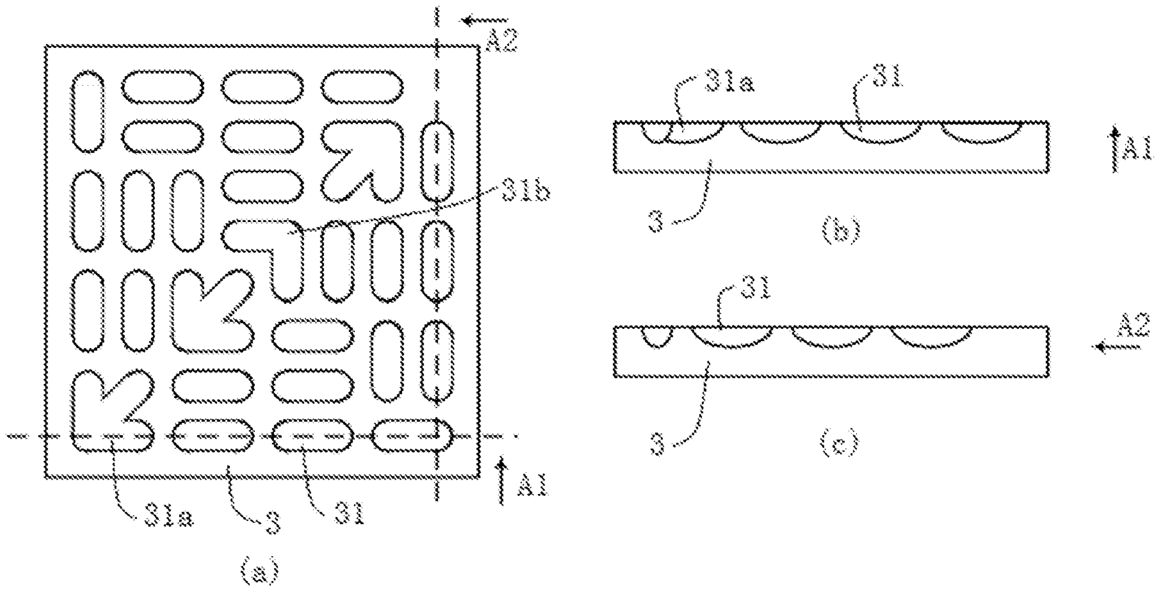
FIG. 8 shows a top view of a second cover plate and cross-sectional views of the second cover plate taken along directions A1, A2 according to a second embodiment of the present disclosure.
Figure 9:
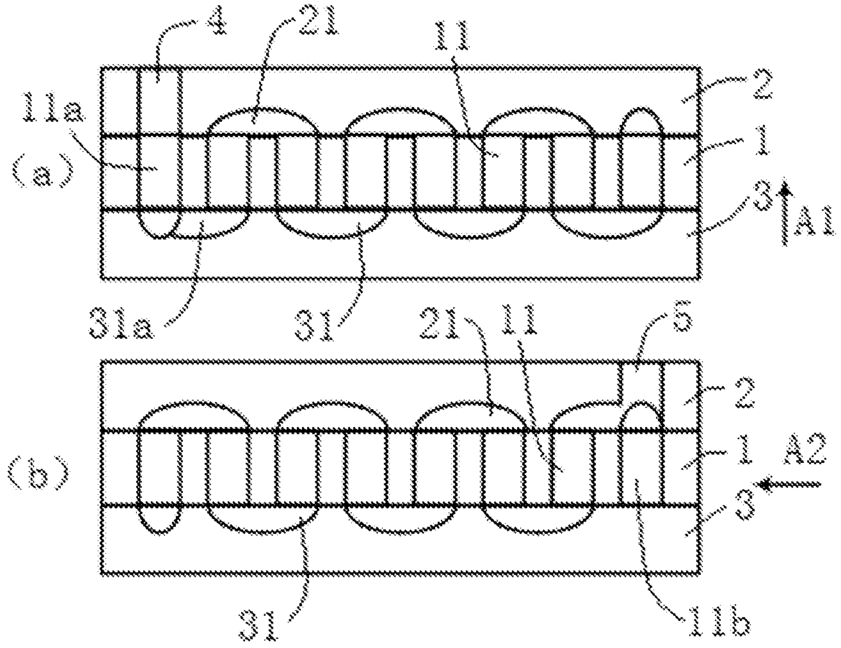
FIG. 9 shows cross-sectional views of a chip packaging structure taken along directions A1, A2 in FIG. 5A according to a second embodiment of the present disclosure.

On this basis, by taking the second flow channel 31*a* communicated with the through hole 11*a* serving as the shared through hole as an example, as shown in FIGS. 8 and 6B, a shape of an orthographic projection of the second flow channel 31*a* on a plane parallel to the sample substrate 1 is formed by three long circles extending from a common end in three different directions, and an angle between long axis directions of any two adjacent long circles is about 45°. The second flow channel 31*a* is communicated with the through hole 11*a* at a common end of the three long circles, and communicated with three adjacent through holes (the through hole downstream and adjacent to the through hole 11*a* on the main path D1 and two through holes downstream and adjacent to the through hole 11*a* on the pair of branch paths (D2*a*, D2*b*)) at other ends of the three long circles away from the common end. Thus, the sample can flow simultaneously from the through hole 11*a* along the main path D1 and the pair of branch paths (D2*a*, D2*b*). Similarly, as shown in FIG. 7, a shape of an orthographic projection of the first flow channel 21*a* on the plane parallel to the sample substrate 1 may also be formed by three long circles extending from the same common end in three different directions, and the first flow channel 21*a* is also communicated with one of the shared through holes in the main path D1 and communicated with the through hole, upstream or downstream, adjacent to the shared through hole in each branch path where the shared through hole is located.

In addition, as shown in FIGS. 7 and 8, a shape of an orthographic projection of each of the first flow channel 21*b* and the second flow channel 31*b* on the plane parallel to the sample substrate 1 may also be formed by two long circles extending from a common end in two different directions, an angle between long axis directions of the two long circles is about 90°. Each of the first flow channel 21*b* and the second flow channel 31*b* is communicated with one of the shared through holes on the main path at the common end of the two long circles, and communicated with two adjacent through holes (two through holes downstream and adjacent to the shared through hole on the pair of branch paths) at other ends of the two long circles away from the common end.

It should be noted that, the embodiment is not limited to the main path and the branch paths described above. In practical applications, the number and the arrangement of the main paths and the branch paths may be arbitrarily designed according to the arrangement of the through holes.

It should be noted that, in practical applications, according to different flow paths, the first flow channel structure of the first cover plate 2 may include one or a combination of the first flow channel 21 (with the shape of one long circle), the first flow channel 21*a* (with the shape of three long circles) and the first flow channel 21*b* (with the shape of two long circles); the second flow channel structure of the second cover plate 3 may include one or a combination of the second flow channel 31 (with the shape of one long circle), the second flow channel 31*a* (with the shape of three long circles) and the second flow channel 31*b* (with the shape of two long circles).

Other structures and functions of the chip packaging structure provided in this embodiment are the same as those of the first embodiment, and are not described herein again.

Third Embodiment

Compared with the first embodiment, the chip packaging structure provided in this embodiment also includes the sample substrate 1, the first cover plate 2 and the second cover plate 3, and the at least one pair of the sample inlet 4 and the sample outlet 5. The structures and functions of these components are the same as those in the first embodiment, but the difference between the first embodiment and the third embodiment is that a plurality of pairs of sample inlets and sample outlets are included.

Figure 10:
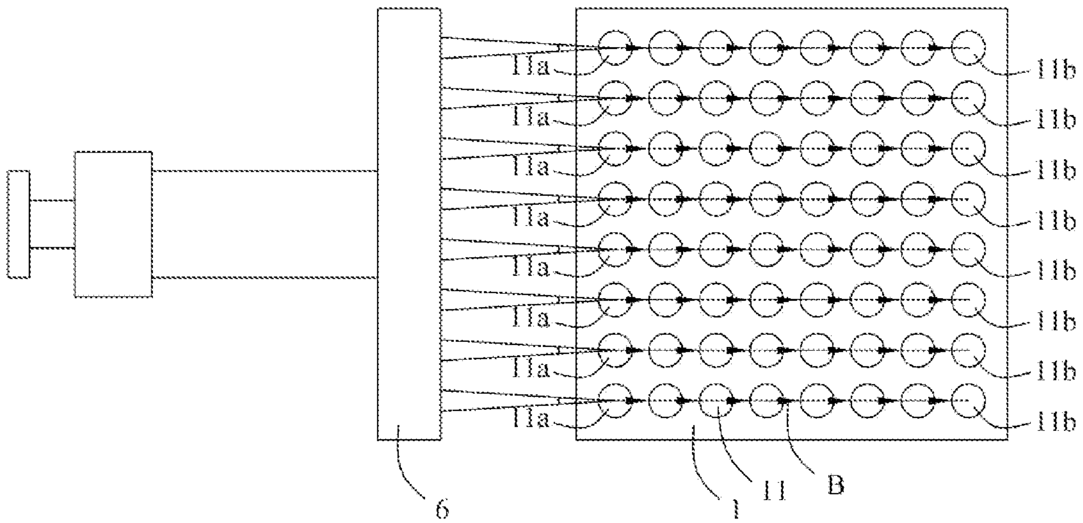
FIG. 10 is a schematic diagram of flow paths of a plurality of through holes in a sample substrate according to a third embodiment of the present disclosure.

Specifically, in order to increase the speed that the sample is introduced, the through holes are arranged in a square array, the number of the pairs of the sample inlets and the sample outlets is the same as the number of rows or columns of the square array, and all the through holes in each row or each column of the square array are correspondingly located on the flow path between each pair of the sample inlet and the sample outlet. For example, as shown in FIG. 10, the number of the pairs of the sample inlets and the sample outlets is the same as the number of rows of the square array, and the head end through hole 11*a* in each row of the square array corresponds to one sample inlet and the tail end through hole 11*b* corresponds to one sample outlet; and all the through holes in each row of the square array are correspondingly located on the flow path between each pair of the sample inlet and the sample outlet. Thus, the sample can be simultaneously injected into the sample inlets. For example, the sample may be simultaneously injected into the sample inlets by using a multi-row pipette 6.

It should be noted that the manner of simultaneously introducing the sample through the sample inlets is not limited to adopting the flow path provided in the third embodiment, and any path may be adopted, which is not particularly limited in the present disclosure.

Other structures and functions of the chip packaging structure provided in this embodiment are the same as those of the first embodiment, and are not described herein again.

Fourth Embodiment

In this embodiment, on the basis of the chip packaging structure provided in any one of the first to third embodiments, the first cover plate 2 and the second cover plate 3 are used as packaging cover plates of the sample substrate 1, that is, the first cover plate 2 and the second cover plate 3 together with the sample substrate 1 form a chip.

Specifically, the sample substrate 1, the first cover plate 2, and the second cover plate 3 may adopt the chip packaging structure provided in any one of the first to third embodiments. By taking the chip packaging structure provided in the first embodiment as an example, the sample substrate 1 includes a through hole region and a non-through hole region (where no through hole is arranged), and the through holes 11 are located in the through hole region. Moreover, each of the first cover plate 2 and the second cover plate 3 may be slid with respect to the sample substrate 1, so that the first flow channel structure on the first cover plate 2 and the second flow channel structure on the second cover plate 3 may be located in the through hole region and communicated with the through holes 11, or may be located in the non-through hole region and isolated from the through holes 11.

Figure 11:
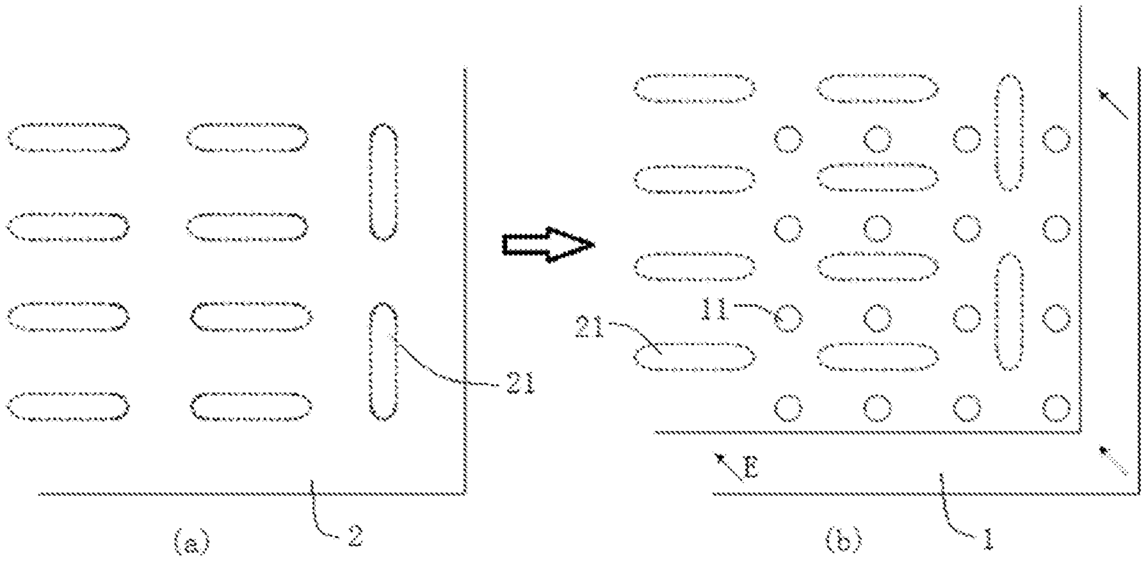
FIG. 11 is a schematic diagram illustrating a sliding process of a chip packaging structure according to a fourth embodiment of the present disclosure.

As shown in FIG. 11, a part (a) of FIG. 11 shows a state of introducing a sample of the chip packaging structure, that is, the first flow channel structure on the first cover plate 2 and the second flow channel structure on the second cover plate 3 are both located in the through hole region and are communicated with the through holes 11. In such case, the sample can be introduced for the sample substrate 1 by using the first cover plate 2 and the second cover plate 3. After the sample being introduced, each of the first cover plate 2 and the second cover plate 3 is slid with respect to the sample substrate 1, so that the chip packaging structure is switched from the state of introducing the sample to a sealing state shown in a part (b) of FIG. 11. In this case, the first flow channel structure on the first cover plate 2 and the second flow channel structure on the second cover plate 3 are both located in the non-through hole region and isolated from the through holes 11, thereby isolating the sample in the sample substrate 1 from outside. The chip packaging structure in the sealing state forms a chip.

In practical applications, the surfaces of the sample substrate 1, the first cover plate 2 and the second cover plate 3 which are attached to each other are smooth surfaces, which ensures that the sample substrate 1, the first cover plate 2 and the second cover plate 3 are closely attached to each other, and the sample in the sample substrate 1 is isolated from outside.

In some implementations, the plurality of through holes 11 are arranged in a square array, and a spacing region between every two adjacent rows of through holes and between every two adjacent columns of through holes in the array forms the non-through hole region, and a width of the spacing region is greater than a width of each of the first flow channel structure and the second flow channel structure, so as to ensure that each of the first flow channel structure and the second flow channel structure can be isolated from the through holes 11 during being located in the spacing region. On this basis, each of the first cover plate 2 and the second cover plate 3 may be slid once with respect to the sample substrate 1 along a diagonal direction of the square array (e.g., a direction E in FIG. 11), to be located in the non-through hole region. However, the embodiment is not limited to thereto. In practical applications, each of the first cover plate 2 and the second cover plate 3 may also be slid once with respect to the sample substrate 1 in the row direction of the square array, and then slid once in the column direction, to be located in the non-through hole region.

Fifth Embodiment

This embodiment provides an improvement for the sample substrate on the basis of the chip packaging structure provided in any one of the first to fourth embodiments. Specifically, a plurality of the sample substrates are included and sequentially attached to each other in a direction from the first cover plate 2 to the second cover plate 3, each sample substrate includes the through hole region and the non-through hole region, and each through hole is located in the through hole region.

In addition, each two adjacent sample substrates may be slid with respect to each other, so that through holes in one of the two adjacent sample substrates are located in the through hole region of the other sample substrate and coincide with the through holes in the other sample substrate, and in this case each sample substrate is in a state of introducing a sample; or, the through holes in one of the two adjacent sample substrates are located in the non-through hole region of the other sample substrate and isolated from the through holes in the other sample substrate, and each sample substrate is in a sealing state.

In some implementations, the through holes in each sample substrate are arranged in a square array, a spacing region between every two adjacent rows of through holes and between every two adjacent columns of through holes in the array is the non-through hole region, and a width of the spacing region is greater than two times a diameter of each through hole, so as to ensure that the through holes in one sample substrate are located in the non-through hole region of the other sample substrate and are isolated from the through holes in the other sample substrate.

Figure 12A:
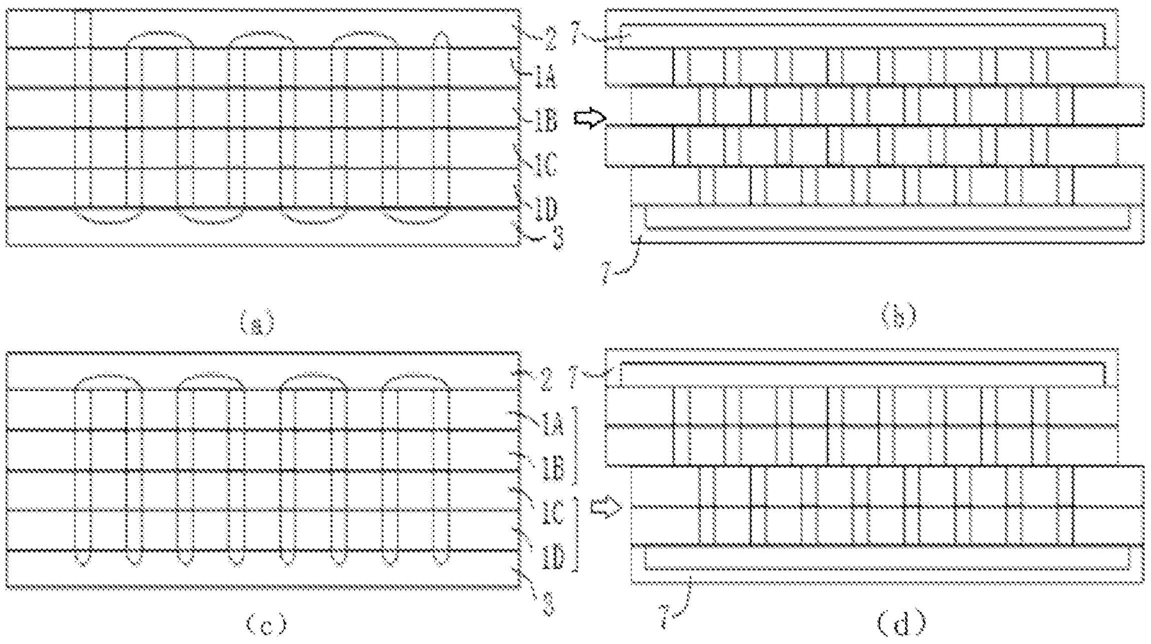
FIG. 12A is a schematic diagram illustrating a sliding process of a chip packaging structure according to a fifth embodiment of the present disclosure.
Figure 12B:
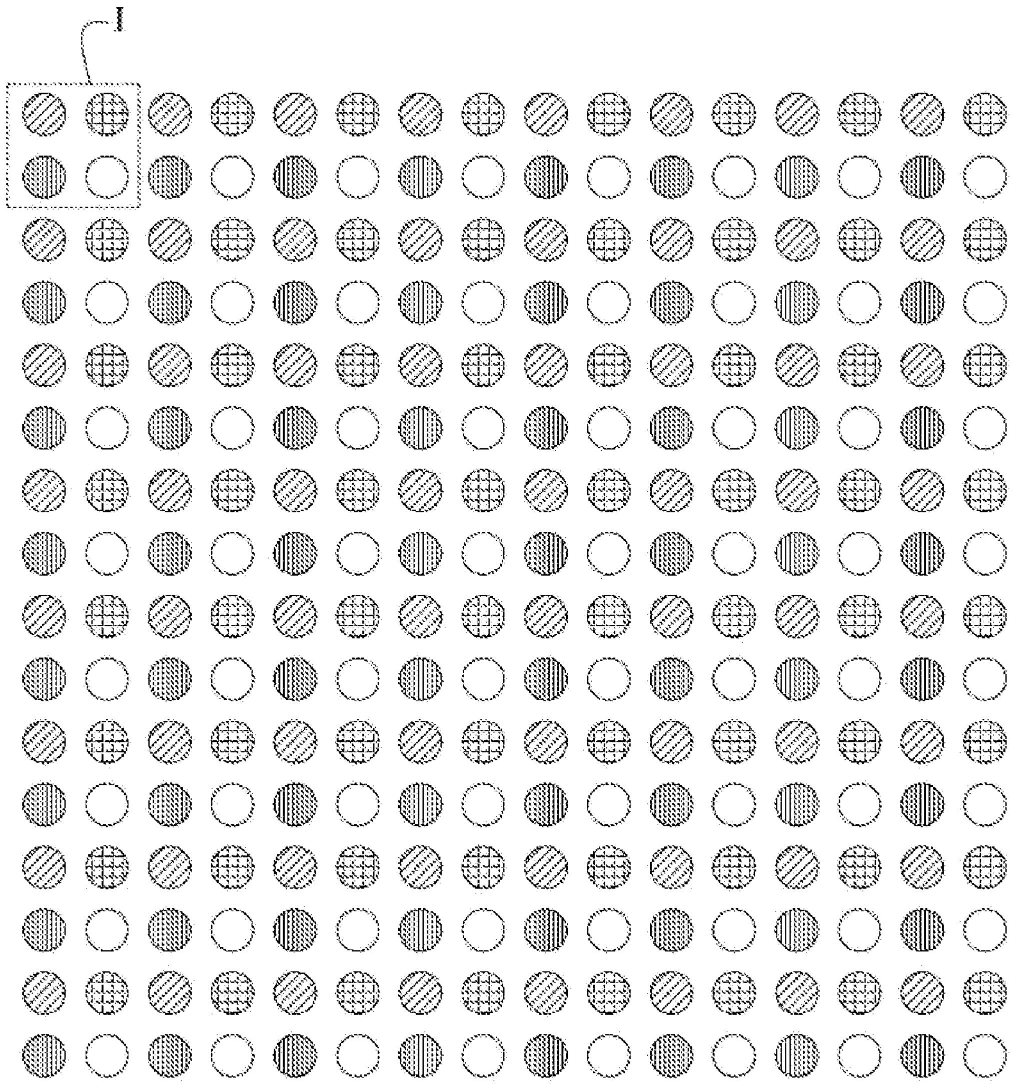
FIG. 12B is a schematic diagram illustrating a layout of all through holes after sliding according to a fifth embodiment of the present disclosure.

As shown in FIG. 12A, by taking four sample substrates as an example, the four sample substrates include a first substrate 1A, a second substrate 1B, a third substrate 1C, and a fourth substrate 1D in the direction from the first cover plate 2 to the second cover plate 3. Each of the four sample substrates is, for example, the same as the sample substrate 1 shown in FIG. 2, and the first cover plate 2 is as shown in FIG. 3, and the second cover plate 3 is as shown in FIG. 4. In FIG. 12A, parts (a) and (b) of FIG. 12A are cross-sectional views of the four sample substrates in the state of introducing the sample taken along the same directions as the directions A1 and A2 in FIGS. 3 and 4, respectively. Parts (c) and (d) of FIG. 12A are cross-sectional views of the four sample substrates in the sealing state taken along the same directions as the directions A1 and A2 in FIGS. 3 and 4, respectively. Further, all the through holes of the four sample substrates in the sealing state are arranged as shown in FIG. 12B. A process during which the four substrates are switched from the state of introducing the sample to the sealing state will be described in detail below.

Figure 12C:
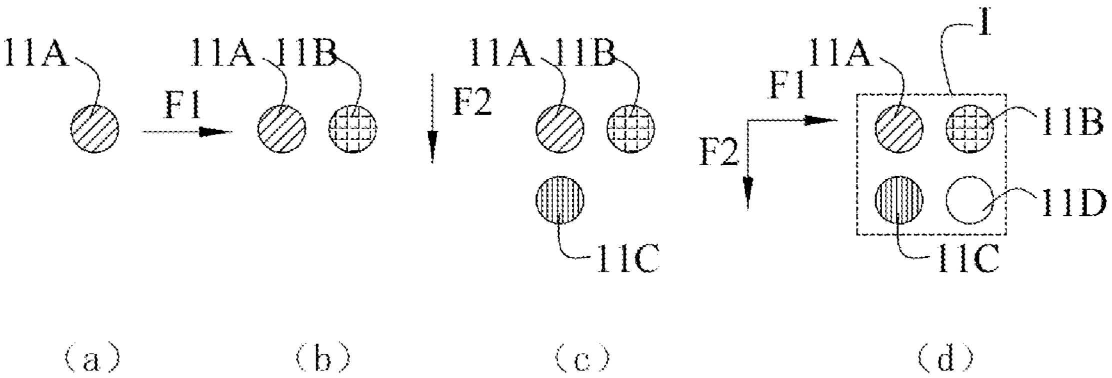
FIG. 12C is a schematic diagram illustrating a sliding process of a single through hole in four sample substrates according to a fifth embodiment of the present disclosure.

Specifically, as shown in FIG. 12C, each of the through holes 11A to 11D is a respective one of the through holes in the first substrate 1A, the second substrate 1B, the third substrate 1C, and the fourth substrate 1D, and completely coincide with each other during the four sample substrates being in the state of introducing the sample, as shown in a part (a) in FIG. 12C, the through holes 11A to 11D are arranged in an array during the four sample substrates being in the sealing state, as shown in a part (d) in FIG. 12C, such arrangement is an arrangement for the four through holes in an I region in FIG. 12B, and the remaining through holes are arranged in this arrangement.

During the four sample substrates are in the state of introducing the sample, firstly, the first substrate 1A is kept still, and the second substrate 1B is slid in a first direction F1 on the plane parallel to the sample substrates, until each through hole 11B in the second substrate 1B is located in the spacing region between two corresponding adjacent through holes 11A in the first substrate 1A, and is in the same row as the through holes 11A in the first substrate 1A, as shown in a part (b) of FIG. 12C; then, the third substrate 1C is slid in a second direction F2 on the plane parallel to the sample substrates, until each through hole 11C in the third substrate 1C is located in the spacing region between two corresponding adjacent through holes 11A in the first substrate 1A, and is in the same column as the through holes 11A in the first substrate 1A, as shown in a part (c) in FIG. 12C; finally, the fourth substrate 1 is slid parallel to the first direction F1 and the second direction F2 (the order is not limited) respectively, until each through hole 11D in the fourth substrate 1D is located in the spacing region between two corresponding adjacent through holes 11A in the first substrate 1A, and is not in the same column and the same row as the through holes 11A in the first substrate 1A, and is in the same row as each through hole 11C in the third substrate 1C and in the same column as each through hole 11B in the second substrate 1B, respectively, as shown in a part (d) in FIG.

12C. In this way, a whole sliding process of the four sample substrates is completed, the four sample substrates are in the sealing state, and samples in the four sample substrates are independent from each other, and no obstacle exists between the through holes in the different sample substrates, which is convenient for observing.

It should be noted that, in a case where a plurality of sample substrates are included, the first cover plate 2 and the second cover plate 3 may also serve as the packaging cover plates for the sample substrates 1, that is, the first cover plate 2 and the second cover plate 3 together with the sample substrates 1 form a chip. In this case, after the sample is introduced for the sample substrates 1 by using the first cover plate 2 and the second cover plate 3, the first cover plate 2 and the second cover plate 3 may be packaged to isolate the samples in two sample substrates 1, adjacent to the first cover plate 2 and the second cover plate respectively, from outside. The specific packaging manner is that the first cover plate 2 and the second cover plate 3 may be slid with respect to the sample substrates 1. The specific manner has been described in detail in the fourth embodiment and is not described herein again. Alternatively, after the sample being introduced for the sample substrates 1 by using the first cover plate 2 and the second cover plate 3, the first cover plate 2 and the second cover plate 3 may be peeled off from the sample substrates 1, and then other packaging cover plates are attached to the surfaces, to which the first cover plate 2 and the second cover plate 3 are previously attached (which will be described in detail later), so that the samples in two sample substrates 1 adjacent to the other packaging cover plates are isolated from outside. For the other sample substrates 1, the samples are isolated from outside in the way of sliding the sample substrates with respect to each other in the fifth embodiment. In this case, the sample substrates 1 and the attached packaging cover plates form a chip, and the first cover plate 2 and the second cover plate 3 are only used for introducing the sample and are peeled off after the sample being introduced.

Sixth Embodiment

The chip packaging structure provided in this embodiment is a variation of the fifth embodiment. In this embodiment, a plurality of sample substrates are included and are sequentially attached to each other in a direction from the first cover plate 2 to the second cover plate 3, each two adjacent sample substrates can be slid with respect to each other. Each sample substrate includes the through hole region and the non-through hole region, and the through holes in each sample substrate are arranged in a square array and located in the through hole region. Furthermore, a region of each sample substrate outside the array is the non-through hole region, which can accommodate the entire square array. However, the embodiment is not limited thereto. In practical applications, the plurality of through holes 11 may also be arranged in an array of any other shape as desired, for example, a rectangular array, a circular array, a honeycomb array, or the like. Alternatively, the plurality of through holes 11 may also be arranged in other manners, instead of being arranged in an array, which is not limited in the present disclosure, as long as the non-through hole region can accommodate all of the through holes of each sample substrate 1.

Figure 13:
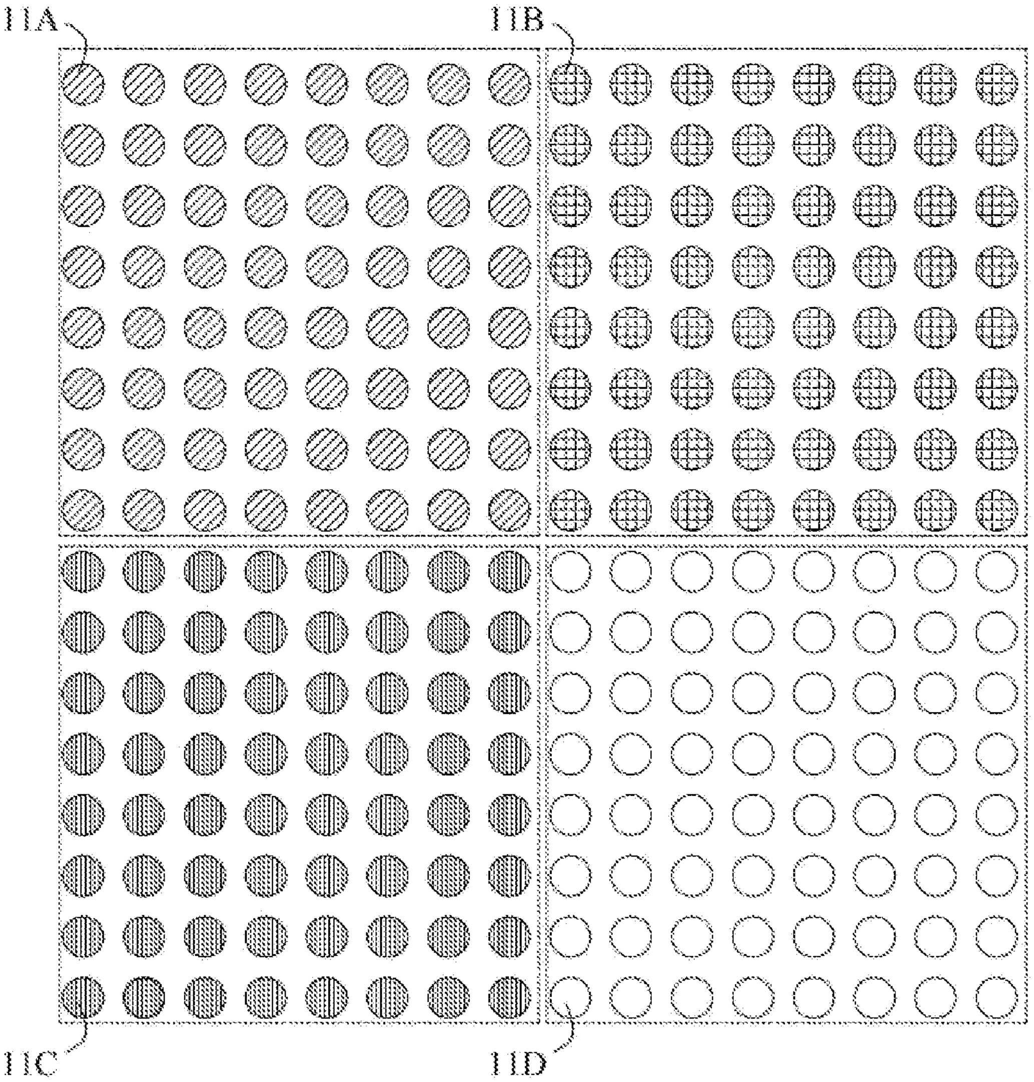
FIG. 13 is a schematic diagram illustrating a layout of all through holes after sliding according to a sixth embodiment of the present disclosure.

Specifically, by taking four sample substrates as an example, the state of introducing the sample is the same as the state of the four sample substrates shown in parts (a) and (c) of FIG. 12A, the sealing state is as shown in FIG. 13, each through hole in one of any two adjacent sample substrates is located in the non-through hole region of the other sample substrate, and square arrays on all the sample substrates are arranged in an array. The specific sliding process is that the square array of the through holes 11A in the first sample substrate is kept still; the second sample substrate is slid until the square array of the through holes 11B is located in the non-through hole region on the right side of the square array of the through holes 11A; the third sample substrate is slid until the square array of the through holes 11C is located in the non-through hole region on the lower side of the square array of the through holes 11A; the fourth sample substrate is slid until the square array of the through holes 11D is located in the non-through hole region diagonally below a diagonal line of the square array of the through holes 11A. In this way, the samples in the four sample substrates can be independent from each other, and no obstacle exists between the through holes in the different sample substrates, which is convenient for observing.

Sixth Embodiment

This embodiment provides an improvement of the sample substrate on the basis of the chip packaging structure provided in any one of the first to fifth embodiments. In this embodiment, a second flow channel structure is disposed on a surface of the first cover plate away from the sample substrate, and a first flow channel structure is disposed on a surface of the second cover plate away from the sample substrate, so that the first cover plate and the second cover plate form two multi-role cover plates with identical structures; the two multi-role cover plates are staggered in the thickness direction of the sample substrate (i.e., the direction in which the thickness of the sample substrate extends), so that the sample inlet in one multi-role cover plate does not overlap with the other multi-role cover plate.

Figure 14:
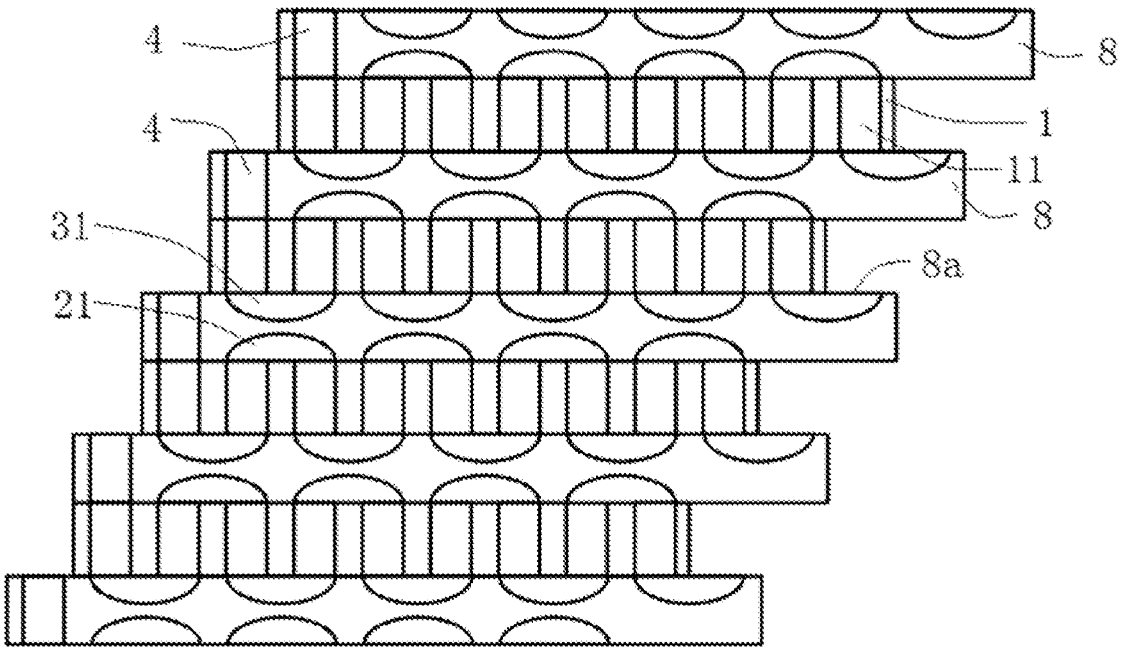
FIG. 14 is a cross-sectional view of a chip packaging structure according to a seventh embodiment of the present disclosure.

Specifically, in the embodiment, as shown in FIG. 14, the sample substrate is, for example, the sample substrate 1 shown in FIG. 2; the first flow channel structure is provided on a surface of the first cover plate opposite to the sample substrate 1 and includes a plurality of first flow channels 21, the structure and arrangement of which are, for example, the same as those of the first flow channels 21 shown in FIG. 3; and the second flow channel structure is provided on a surface of the second cover plate opposite to the sample substrate 1, and includes a plurality of second flow channels 31, the structure and arrangement of which are, for example, the same as those of the second flow channels 31 shown in FIG. 4. On this basis, a second flow channel structure is provided on a surface of the first cover plate away from the sample substrate 1, and is the same as the second flow channel structure shown in FIG. 4; a first flow channel structure is provided on a surface of the second cover plate away from the sample substrate 1, and is the same as the first flow channel structure shown in FIG. 3. In this way, as shown in FIG. 14, the first cover plate and the second cover plate form two multi-role cover plates 8 with identical structures; the two multi-role cover plates 8 are staggered, i.e., stacked in a staggered manner, in the thickness direction of the sample substrate 1, so that the sample inlet 4 and the sample outlet of one multi-role cover plate 8 do not overlap with the other multi-role cover plate 8.

In some implementations, as shown in FIG. 14, there are at least three multi-role cover plates 8, at least one sample substrate 1 is disposed between every two adjacent multi-role cover plates 8, and sequentially attached along a direction from the first cover plate to the second cover plate (i.e., from one multi-role cover plate 8 adjacent to the at least one sample substrate 1 to the other multi-role cover plate 8), and the at least three multi-role cover plates 8 are sequentially staggered in the thickness direction of the sample substrate 1, so that the sample inlet 4 and the sample outlet in each multi-role cover plate do not overlap with the other multi-role cover plates 8.

That is, each multi-role cover plate 8 has the first flow channel structure and the second flow channel structure, and thus may serve as the first cover plate or the second cover plate. In a case of a plurality of sample substrates being included, each multi-role cover plate 8 may serve as both the first cover plate and the second cover plate. Therefore, a uniform specification of the cover plate can be realized, which facilitates the processing of products. Moreover, the sample inlet 4 and the sample outlet in each multi-role cover plate 8 do not overlap with the other multi-role cover plates 8, so that the sample inlet 4 and the sample outlet are directly connected to outside, and the sample can be more conveniently added to the sample inlets 4 in the multi-role cover plates 8 simultaneously.

In some implementations, as shown in FIG. 14, the sample outlet 8*a* of each multi-role cover plate 8 is an opening, at an end of one of the second flow channels 31, which does not overlap with the other multi-role cover plates 8 and can be directly connected to outside, but the embodiment is not limited thereto.

It should be noted that each multi-role cover plate 8 may serve as a packaging cover plate of the sample substrate 1, that is, the multi-role cover plates 8 and the sample substrate 1 together form a chip. In this case, after the sample being introduced for the sample substrates 1 by using the multi-role cover plates 8, the multi-role cover plates 8 may be packaged to isolate the sample in the sample substrates 1 from outside. The specific packaging manner is that the multi-role cover plates 8 may be slid with respect to the sample substrates 1, as that in the chip packaging structure provided in the fourth embodiment. Alternatively, the multi-role cover plates 8 may be packaged in any other packaging manner. Alternatively, after the sample being introduced for the sample substrates 1 by using the multi-role cover plates 8, the multi-role cover plates 8 may be peeled off from the sample substrates 1, and then other packaging cover plates are attached to the surfaces of the sample substrates 1, to which the multi-role cover plates 8 are previously attached, so that the sample in the sample substrates 1 is isolated from outside. In this case, the sample substrates 1 and the attached packaging cover plates form a chip, and the multi-role cover plates 8 are used for introducing the sample and are peeled off after the sample being introduced.

In a case where a plurality of sample substrates are included between two adjacent multi-role cover plates 8, the multi-role cover plates 8 may also serve as the packaging cover plates for the sample substrates 1, that is, the multi-role cover plates 8 together with the sample substrates 1 form a chip. Alternatively, after the sample being introduced for the sample substrates 1 by using the multi-role cover plates 8, the multi-role cover plates 8 may be peeled off from the sample substrates 1, and then other packaging cover plates are attached to the surfaces of the sample substrates 1, to which the multi-role cover plates 8 are previously attached, so that samples in two sample substrates 1 adjacent to the multi-role cover plates 8 are isolated from outside. For the other sample substrates 1, the samples are isolated from outside in the way of sliding the sample substrates with respect to each other in the fifth embodiment.

Seventh Embodiment

This embodiment further provides a chip packaging method for the chip packaging structure provided in any one of above embodiments except for the fourth embodiment, including following steps 1 to 9.

Figure 15:
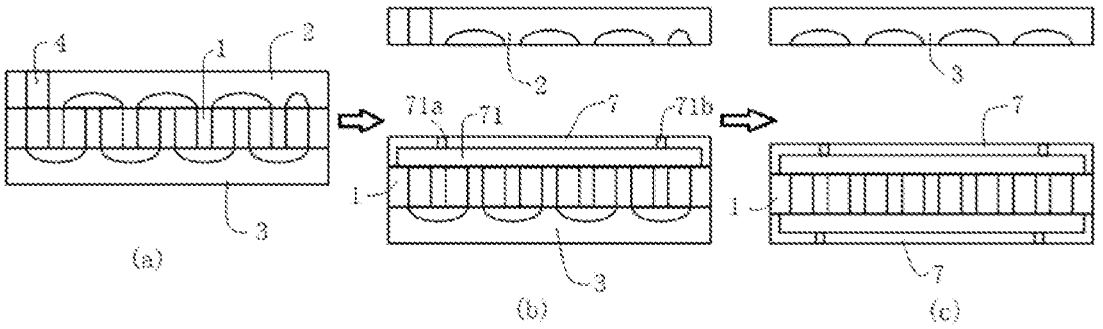
FIG. 15 is a schematic diagram showing a process of a chip packaging method according to an eighth embodiment of the present disclosure.

Step 1, as shown in a part (a) in FIG. 15, injecting a sample through each sample inlet 4 until the sample fully fills the continuous channel along the flow path and flows out from each sample outlet.

Step 2, as shown in a part (b) in FIG. 15, peeling off one of the first cover plate 2 and the second cover plate 3 from the sample substrate 1.

Step 3, as shown in the part (b) in FIG. 15, attaching a sealing cover plate 7 to the surface of the sample substrate 1, to which one of the first cover plate 2 and the second cover plate 3 is previously attached, wherein a sealing groove 71 is provided in the sealing cover plate 7, and an orthographic projection of the sealing groove 71 on a plane parallel to the sample substrate 1 completely covers an orthographic projection of all the through holes on the plane parallel to the sample substrate 1, so that the sample in the sample substrate 1 is isolated from outside; and an inlet 71*a* and an outlet 71*b* are provided in the sealing cover plate 7 and communicated with the sealing groove 71 and used for injecting and discharging a sealing medium (such as mineral oil), respectively.

Step 4, injecting the sealing medium into the sealing groove 71 from the inlet 71*a* until the sealing medium fully fills the sealing groove 71 and flows out from the outlet 71*b*.

Step 5, blocking the inlet 71*a* and the outlet 71*b*, and then turning over the whole chip packaging structure by 180°.

Step 6, as shown in a part (c) of FIG. 15, peeling off the other of the first cover plate 2 and the second cover plate 3 from the sample substrate 1.

Step 7, as shown in the part (c) of FIG. 15, attaching another sealing cover plate 7 to the surface of the sample substrate 1 to which the other of the first cover plate 2 and the second cover plate 3 is previously attached.

Step 8, injecting a sealing medium into a sealing groove 71 from an inlet 71*a* of the another sealing cover plate 7 until the sealing medium fully fills the sealing groove 71 and flows out from an outlet 71*b*.

Step 9, blocking the inlet 71*a* and the outlet 71*b* of the another sealing cover plate 7.

Therefore, after the sample being introduced for the sample substrate 1 by using the first cover plate 2 and the second cover plate 3, the first cover plate 2 and the second cover plate 3 may be peeled off from the sample substrate 1, and then the packaging cover plates 7 are attached to the surfaces of the sample substrate 1, to which the first cover plate 2 and the second cover plate 3 are previously attached, so that the sample in the sample substrate 1 is isolated from outside. In this case, the sample substrate 1 and the attached packaging cover plates 7 form a chip, and the first cover plate 2 and the second cover plate 3 are used for introducing the sample and are peeled off after the sample being introduced.

In practical applications, each packaging cover plate 7 may be attached to the sample substrate 1 by using glue (e.g., UV glue, etc.). Further, after the injection for the sealing medium is completed, the inlet 71*a* and the outlet 71*b* of each sealing cover plate 7 may be blocked with glue (e.g., UV glue, etc.). Furthermore, the glue and the sealing cover plate 7 are both made of a transparent material (the material of the sealing cover plate 7 is, for example, glass), which is convenient for observing.

In some implementations, for the chip packaging structure (including the plurality of sample substrates) provided in the fifth embodiment, after the step 9 is completed, the method further includes following step 10.

Step 10, keeping a first sample substrate (for example, the first substrate 1A in FIG. 12A) adjacent to the first cover plate 2 or the second cover plate 3 still, and sequentially sliding the other sample substrates (for example, the second substrate 1B to the fourth substrate 1D in FIG. 12A), until through holes in one of every two adjacent sample substrates are located in the non-through hole region of the other sample substrate and isolated from through holes in the other sample substrate.

Therefore, samples in the sample substrates are independent from each other, and no obstacle exists between the through holes in different sample substrates, which is convenient for observing.

As shown in FIG. 12A, by taking four sample substrates as an example, the four sample substrates include a first substrate 1A, a second substrate 1B, a third substrate 1C, and a fourth substrate 1D in the direction from the first cover plate 2 to the second cover plate 3. During the four sample substrates are in the state of introducing the sample, as shown in FIG. 12C, firstly, the first substrate 1A is kept still, and the second substrate 1B is slid in a first direction F1 on the plane parallel to the sample substrates, until each through hole 11B in the second substrate 1B is located in the spacing region between two corresponding adjacent through holes 11A in the first substrate 1A, and is in the same row as the through holes 11A in the first substrate 1A, as shown in a part (b) of FIG. 12C; then, the third substrate 1C is slid in a second direction F2 on the plane parallel to the sample substrates, until each through hole 11C in the third substrate 1C is located in the spacing region between two corresponding adjacent through holes 11A in the first substrate 1A, and is in the same column as the through holes 11A in the first substrate 1A, as shown in a part (c) in FIG. 12C; finally, the fourth substrate 1 is slid parallel to the first direction F1 and the second direction F2 (the order is not limited), until each through hole 11D in the fourth substrate 1D is located in the spacing region between two corresponding adjacent through holes 11A in the first substrate 1A, and is not in the same column and the same row as the through holes 11A in the first substrate 1A, and is in the same row as each through hole 11C in the third substrate 1C and in the same column as each through hole 11B in the second substrate 1B, respectively, as shown in a part (d) in FIG. 12C. In this way, a whole sliding process of four sample substrates is completed, the four sample substrates are in the sealing state, and samples in the four sample substrates are independent from each other, and no obstacle exists between the through holes in different sample substrates, which is convenient for observing.

Eighth Embodiment

This embodiment further provides a chip packaging method for the chip packaging structure provided in the fourth embodiment, including following steps 1 to 3.

Step 1, as shown in a part (a) of FIG. 11, enabling the first flow channel structure (e.g., including the plurality of first flow channels 21) and the second flow channel structure (e.g., including the plurality of second flow channels 31) to be located in the through hole region and to be communicated with the through holes 11.

Step 2, injecting the sample through each sample inlet 4 until the sample fully fills the continuous channel along the flow path and flows out from each sample outlet 5, thereby completing the introducing of the sample.

Step 3, sliding each of the first cover plate 2 and the second cover plate 3 with respect to the sample substrate 1, so that the first flow channel structure and the second flow channel structure are located in the non-through hole region, thereby isolating the sample in the sample substrate 1 from outside.

In the embodiment, the first cover plate 2 and the second cover plate 3 serve as packaging cover plates of the sample substrate 1, that is, the first cover plate 2 and the second cover plate 3 together with the sample substrate 1 form a chip.

In some implementations, the plurality of through holes 11 are arranged in a square array, and a spacing region between every two adjacent rows of through holes and between every two adjacent columns of through holes in the array forms the non-through hole region, and a width of the spacing region is greater than a width of each of the first flow channel structure and the second flow channel structure. On this basis, each of the first cover plate 2 and the second cover plate 3 may be slid once with respect to the sample substrate 1 along a diagonal direction of the square array (e.g., a direction E in FIG. 11), to be located in the non-through hole region. However, the embodiment is not limited thereto. In practical applications, each of the first cover plate 2 and the second cover plate 3 may also be slid once with respect to the sample substrate 1 in the row direction of the square array, and then slid once in the column direction, to be located in the non-through hole region.

In summary, in the chip packaging structure and the chip packaging method provided by the above embodiments of the present disclosure, not only the sample can fully fill all the through holes, but also no bubble is generated because the through holes penetrate through the sample substrate, thereby solving the problems that the sample cannot fully fill micropores, bubbles exist in the micropores, and the like after the sample entering into the micropores.

It should be understood that the above embodiments are merely exemplary embodiments adopted to explain the principles of the present disclosure, and the present disclosure is not limited thereto. It will be apparent to one of ordinary skill in the art that various changes and modifications may be made without departing from the spirit and scope of the present disclosure, and such changes and modifications also fall within the scope of the present disclosure.

What is claimed is:

1. A chip packaging structure, comprising:

a sample substrate with a plurality of through holes therein penetrating through the sample substrate along a thickness direction of the sample substrate;

a first cover plate and a second cover plate respectively on two opposite sides of the sample substrate along the thickness direction of the sample substrate and attached to the sample substrate; and at least one pair of a sample inlet and a sample outlet, each pair of the sample inlet and the sample outlet being in one of the first cover plate and the second cover plate or in the first cover plate and the second cover plate, respectively, and a flow path being between each pair of the sample inlet and the sample outlet, wherein a first flow channel structure is on a surface of the first cover plate opposite to the sample substrate, a second flow channel structure is on a surface of the second cover plate opposite to the sample substrate, and the first flow channel structure and the second flow channel structure are connected together with the plurality of through holes, to form a continuous channel corresponding to the flow path between each pair of the sample inlet and the sample outlet, wherein the sample substrate comprises a through hole region and a non-through hole region, the plurality of through holes are in the through hole region; and each of the first cover plate and the second cover plate is slidable with respect to the sample substrate, so that the first flow channel structure and the second flow channel structure are in the through hole region and are communicated with the plurality of through holes; or the first flow channel structure and the second flow channel structure are in the non-through hole region and are isolated from the plurality of through holes.

2. The chip packaging structure according to claim 1, wherein the first flow channel structure comprises a plurality of first flow channels arranged at intervals; the second flow channel structure comprises a plurality of second flow channels arranged at intervals;

two through holes of the through holes on each same flow path are at a start point and an end point of the flow path, respectively, the through hole at the start point comprises an end communicated with the sample inlet, and another end communicated with the through hole downstream and adjacent to the through hole at the start point through one first flow channel or one second flow channel; the through hole at the end point comprises an end communicated with the sample outlet, and another end communicated with the through hole upstream and adjacent to the through hole at the end point through one first flow channel or one second flow channel; and both ends of each remaining through hole are communicated with two through holes, upstream and downstream, adjacent to the through hole through one first flow channel and one second flow channel, respectively.

3. The chip packaging structure according to claim 2, wherein the flow path between the at least one pair of the sample inlet and the sample outlet comprises a main path and a plurality of branch paths, two through holes of through holes on each branch path are respectively at a start point and an end point of the branch path, and are shared by the main path; remaining through holes on the branch path are not shared by the main path; and for each shared through hole, the first flow channel or the second flow channel communicated with the shared through hole is communicated with the through hole on the main path, upstream or downstream, adjacent to the shared through hole, and communicated with the through hole on the branch path where the shared through hole is located, upstream or downstream, adjacent to the shared through hole.

4. The chip packaging structure according to claim 3, wherein the plurality of through holes are arranged in a square array, and through holes at both ends of a first diagonal line of the square array are respectively communicated with one pair of the sample inlet and the sample outlet; and all the through holes on the first diagonal line are on the main path; and the plurality of branch paths are divided into a plurality of pairs, each pair of branch paths is symmetrically distributed on both sides of the first diagonal line, and two through holes at a start point and an end point of each pair of branch paths are shared by the main path, and through holes on a start point and an end point of each branch path are symmetrically distributed on both sides of a second diagonal line of the square array.

5. The chip packaging structure according to claim 2, wherein the plurality of through holes are arranged in a rectangular or square array, the through holes at a head end and a tail end in a first row or column of the rectangular or square array serve as a start point or an end point of the flow path, and are respectively communicated with one pair of the sample inlet and the sample outlet; and the flow path comprises a plurality of sub-paths connected together end to end and in series, the number of the plurality of sub-paths is the same as the number of rows or columns of the rectangular or square array, and all the through holes on each row or column of the rectangular or square array are correspondingly on each sub-path.

6. The chip packaging structure according to claim 2, wherein the plurality of through holes are arranged in a rectangular or square array, the number of the pairs of the sample inlets and the sample outlets is the same as the number of rows or columns of the rectangular or square array, and all the through holes in each row or each column of the rectangular or square array are correspondingly on the flow path between each pair of the sample inlet and the sample outlet.

7. The chip packaging structure according to claim 2, wherein each first flow channel is a first groove in the surface of the first cover plate opposite to the sample substrate, and each second flow channel is a second groove in the surface of the second cover plate opposite to the sample substrate, and an orthographic projection of an inner surface of each of the first groove and the second groove on a plane parallel to the thickness direction of the sample substrate is of an arc shape.

8. The chip packaging structure according to claim 7, wherein the arc shape is a shape obtained by taking an arc from a circle or an ellipse.

9. The chip packaging structure according to claim 7, wherein inner surfaces of a hole wall of each through hole, the first groove and the second groove are all surfaces subjected to hydrophilic treatment; a surface of the sample substrate except for the plurality of through holes is a surface subjected to hydrophobic treatment; a surface of the first cover plate except for the inner surface of the first groove is a surface subjected to hydrophobic treatment; and a surface of the second cover plate except for the inner surface of the second groove is a surface subjected to hydrophobic treatment.

10. The chip packaging structure according to claim 7, wherein the first cover plate and the second cover plate are made of polymethyl methacrylate or glass.

11. The chip packaging structure according to claim 1, wherein the second flow channel structure is on a surface of the first cover plate away from the sample substrate, and the first flow channel structure is on a surface of the second cover plate away from the sample substrate, so that the first cover plate and the second cover plate form two multi-role cover plates with identical structures; and the two multi-role cover plates are staggered in the thickness direction of the sample substrate, so that the sample inlet and the sample outlet in one multi-role cover plate of the two multi-role cover plates do not overlap with the other multi-role cover plate of the two multi-role cover plates.

12. The chip packaging structure according to claim 11, wherein at least three multi-role cover plates are included, at least one sample substrate is between every two adjacent multi-role cover plates, and sequentially attached together along a direction from the first cover plate to the second cover plate, and the at least three multi-role cover plates are sequentially staggered in the thickness direction of the at least one sample substrate, so that the sample inlet and the sample outlet in each multi-role cover plate do not overlap with the other multi-role cover plates.

13. The chip packaging structure according to claim 1, wherein a plurality of sample substrates are included and sequentially attached to each other in a direction from the first cover plate to the second cover plate, each sample substrate comprises a through hole region and a non-through hole region, and each through hole is in the through hole region; and every two adjacent sample substrates are slidable with respect to each other, so that through holes in one of the two adjacent sample substrates are in the through hole region of the other sample substrate and coincide with corresponding through holes in the other sample substrate; or, the through holes in one of the two adjacent sample substrates are in the non-through hole region of the other sample substrate and isolated from the through holes in the other sample substrate.

14. The chip packaging structure according to claim 13, wherein the through holes in each sample substrate are arranged in a rectangular or square array, a spacing region between every two adjacent rows of through holes and between every two adjacent columns of through holes in the rectangular or square array is the non-through hole region, and a width of the spacing region is greater than two times a diameter of each through hole.

15. The chip packaging structure according to claim 13, wherein the through holes in each sample substrate are arranged in a rectangular or square array, and a region of the sample substrate outside the rectangular or square array is the non-through hole region capable of accommodating the rectangular or square array entirely, and in response to that the through holes in one of the two adjacent sample substrates are in the non-through hole region of the other sample substrate of the two adjacent sample substrates, arrays on all the sample substrates are arranged in an array.

16. The chip packaging structure according to claim 1, wherein the plurality of through holes are arranged in a square array, and a spacing region between every two adjacent rows of through holes and between every two adjacent columns of through holes in the square array is the non-through hole region, and a width of the spacing region is greater than that of each of the first flow channel structure and the second flow channel structure.

17. A chip packaging method, applied to a chip packaging structure, the chip packaging structure comprises: a sample substrate with a plurality of through holes therein penetrating through the sample substrate along a thickness direction of the sample substrate; a first cover plate and a second cover plate respectively on two opposite sides of the sample substrate along the thickness direction of the sample substrate and attached to the sample substrate; and at least one pair of a sample inlet and a sample outlet, each pair of the sample inlet and the sample outlet being in one of the first cover plate and the second cover plate or in the first cover plate and the second cover plate, respectively, and a flow path being between each pair of the sample inlet and the sample outlet, wherein a first flow channel structure is on a surface of the first cover plate opposite to the sample substrate, a second flow channel structure is on a surface of the second cover plate opposite to the sample substrate, and the first flow channel structure and the second flow channel structure are connected together with the plurality of through holes, to form a continuous channel corresponding to the flow path between each pair of the sample inlet and the sample outlet, the method comprises:

injecting a sample through each sample inlet until the sample fully fills the continuous channel along the flow path and flows out from each sample outlet;

peeling off one of the first cover plate and the second cover plate from the sample substrate;

attaching a sealing cover plate to a surface of the sample substrate, to which one of the first cover plate and the second cover plate is previously attached, a sealing groove being provided in the sealing cover plate, and an orthographic projection of the sealing groove on a plane parallel to the sample substrate completely covering an orthographic projection of all the through holes on the plane parallel to the sample substrate, and an inlet and an outlet being provided in the sealing cover plate and communicated with the sealing groove;

injecting a sealing medium into the sealing groove through the inlet until the sealing medium fully fills the sealing groove and flows out from the outlet;

blocking the inlet and the outlet, and then turning over the chip packaging structure by 180°;

peeling off the other of the first cover plate and the second cover plate from the sample substrate;

attaching another sealing cover plate to a surface of the sample substrate to which the other of the first cover plate and the second cover plate is previously attached;

injecting a sealing medium into a sealing groove from an inlet of the another sealing cover plate until the sealing medium fully fills the sealing groove and flows out from an outlet; and blocking the inlet and the outlet of the another sealing cover plate.

18. The chip packaging method according to claim 17, wherein a plurality of sample substrates are included and sequentially attached to each other in a direction from the first cover plate to the second cover plate, each sample substrate comprises a through hole region and a non-through hole region, and each through hole is located in the through hole region; and every two adjacent sample substrates are slidable with respect to each other, so that through holes in one of the two adjacent sample substrates are located in the through hole region of the other sample substrate and coincide with corresponding through holes in the other sample substrate; or, the through holes in one of the two adjacent sample substrates are located in the non-through hole region of the other sample substrate and isolated from the through holes in the other sample substrate; and after blocking the inlet and the outlet of the another sealing cover plate, the chip packaging method further comprises:

keeping a first sample substrate adjacent to the first cover plate or the second cover plate still, and sequentially sliding the other sample substrates, until the through holes in one of the two adjacent sample substrates are located in the non-through hole region of the other sample substrate and isolated from the through holes in the other sample substrate.

19. A chip packaging method, applied to the chip packaging structure according to claim 17, comprising:

enabling the first flow channel structure and the second flow channel structure to be located in the through hole region and to be communicated with the plurality of through holes;

injecting a sample through each sample inlet until the sample fully fills the continuous channel along the flow path and flows out from each sample outlet; and sliding each of the first cover plate and the second cover plate with respect to the sample substrate, so that the first flow channel structure and the second flow channel structure are located in the non-through hole region.

20. A chip packaging structure, comprising:

a sample substrate with a plurality of through holes therein penetrating through the sample substrate along a thickness direction of the sample substrate;

a first cover plate and a second cover plate respectively on two opposite sides of the sample substrate along the thickness direction of the sample substrate and attached to the sample substrate; and at least one pair of a sample inlet and a sample outlet, each pair of the sample inlet and the sample outlet being in one of the first cover plate and the second cover plate or in the first cover plate and the second cover plate, respectively, and a flow path being between each pair of the sample inlet and the sample outlet, wherein a first flow channel structure is on a surface of the first cover plate opposite to the sample substrate, a second flow channel structure is on a surface of the second cover plate opposite to the sample substrate, and the first flow channel structure and the second flow channel structure are connected together with the plurality of through holes, to form a continuous channel corresponding to the flow path between each pair of the sample inlet and the sample outlet, wherein a plurality of sample substrates are included and sequentially attached to each other in a direction from the first cover plate to the second cover plate, each sample substrate comprises a through hole region and a non-through hole region, and each through hole is in the through hole region; and every two adjacent sample substrates are slidable with respect to each other, so that through holes in one of the two adjacent sample substrates are in the through hole region of the other sample substrate and coincide with corresponding through holes in the other sample substrate; or, the through holes in one of the two adjacent sample substrates are in the non-through hole region of the other sample substrate and isolated from the through holes in the other sample substrate.

* * * * *